United States Patent
Eberle et al.

(10) Patent No.: US 7,065,580 B1
(45) Date of Patent: Jun. 20, 2006

(54) METHOD AND APPARATUS FOR A PIPELINED NETWORK

(75) Inventors: Hans Eberle, Mountain View, CA (US); Neil C. Wilhelm, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/540,731

(22) Filed: Mar. 31, 2000

(51) Int. Cl.
    *G06F 15/16* (2006.01)

(52) U.S. Cl. ............... 709/232; 709/203; 709/231; 370/447; 370/461

(58) Field of Classification Search ........... 709/203, 709/231, 232; 370/447, 461, 386, 388, 390
See application file for complete search history.

(56) References Cited

U.S. PATENT DOCUMENTS

| | | | |
|---|---|---|---|
| 3,676,846 A | | 7/1972 | Bush |
| 4,648,029 A | | 3/1987 | Cooper et al. |
| 4,654,654 A | | 3/1987 | Butler et al. |
| 4,674,082 A | * | 6/1987 | Flanagin et al. ............ 370/355 |
| 4,792,944 A | | 12/1988 | Takahashi et al. |
| 4,984,237 A | | 1/1991 | Franaszek |
| 5,042,032 A | | 8/1991 | Dighe et al. |
| 5,218,602 A | * | 6/1993 | Grant et al. ................ 370/390 |
| 5,267,235 A | | 11/1993 | Thacker ....................... 370/60 |
| 5,359,320 A | | 10/1994 | Jaffe et al. |
| 5,367,643 A | * | 11/1994 | Chang et al. ............... 709/231 |
| 5,467,211 A | * | 11/1995 | Haney et al. ................ 398/45 |
| 5,539,747 A | | 7/1996 | Ito et al. |
| 5,544,163 A | * | 8/1996 | Madonna .................... 370/352 |
| 5,550,815 A | | 8/1996 | Cloonan et al. |
| 5,560,016 A | | 9/1996 | Fiebrich et al. |
| 5,564,062 A | | 10/1996 | Meaney et al. |
| 5,566,171 A | * | 10/1996 | Levinson .................... 370/352 |
| 5,566,182 A | | 10/1996 | Gantner et al. |
| 5,577,035 A | | 11/1996 | Hayter et al. |
| 5,617,575 A | | 4/1997 | Sakakibara et al. |

(Continued)

FOREIGN PATENT DOCUMENTS

EP    0 463 943 A2    1/1992

(Continued)

OTHER PUBLICATIONS

Working Draft, T11.1/Project 1245-D/Rev 1.9, "Information Technology—Scheduled Transfer Protocol (ST)", May 28, 1998, pp. 1-85.

(Continued)

*Primary Examiner*—William C. Vaughn, Jr.
*Assistant Examiner*—Phuoc H. Nguyen
(74) *Attorney, Agent, or Firm*—Zagorin O'Brien Graham LLP

(57) ABSTRACT

A computer system coupled with a pipelined network includes a plurality of initiator nodes coupled to send packets into the network. A plurality of target nodes receive packets sent into the network. The network uses a plurality of pipeline stages to transmit data across the network. Each pipeline stage consumes a known time period, which provides for a predetermined time period for transmission for each packet that is successfully sent from one of the initiator nodes to one of the target nodes. The pipelined network is synchronous in that boundaries of all the pipeline stages are aligned. The pipeline stages include at least an arbitration stage to obtain a path through the network, a transfer stage during which a data packet is transmitted, and an acknowledge stage during which successful transmission of a packet is indicated by the target. To simplify network design, all the pipeline stages are implemented to have equal length.

27 Claims, 13 Drawing Sheets

U.S. PATENT DOCUMENTS

| | | | |
|---|---|---|---|
| 5,684,961 A * | 11/1997 | Cidon et al. | 709/243 |
| 5,771,229 A | 6/1998 | Gavrilovich | |
| 5,790,545 A * | 8/1998 | Holt et al. | 370/398 |
| 5,821,875 A | 10/1998 | Lee et al. | |
| 5,838,681 A | 11/1998 | Bonomi et al. | |
| 5,884,046 A | 3/1999 | Antonov | 395/200.68 |
| 5,954,799 A | 9/1999 | Goheen et al. | |
| 6,009,092 A | 12/1999 | Basilico | |
| 6,023,732 A | 2/2000 | Moh et al. | 709/232 |
| 6,034,954 A | 3/2000 | Takase et al. | 370/362 |
| 6,067,300 A | 5/2000 | Baumert et al. | |
| 6,072,772 A | 6/2000 | Charny et al. | |
| 6,111,886 A | 8/2000 | Stewart | |
| 6,115,373 A | 9/2000 | Lea | |
| 6,122,274 A * | 9/2000 | Kumar | 370/388 |
| 6,141,329 A | 10/2000 | Turner | |
| 6,160,812 A | 12/2000 | Bauman et al. | |
| 6,161,160 A * | 12/2000 | Niu et al. | 709/234 |
| 6,188,686 B1 | 2/2001 | Smith | |
| 6,198,749 B1 | 3/2001 | Hui et al. | |
| 6,208,653 B1 | 3/2001 | Ogawa et al. | |
| 6,212,194 B1 | 4/2001 | Hsieh | |
| 6,304,578 B1 | 10/2001 | Fluss | |
| 6,327,175 B1 * | 12/2001 | Manapat et al. | 365/154 |
| 6,336,156 B1 * | 1/2002 | Chiang | 710/45 |
| 6,345,050 B1 * | 2/2002 | Alleyne et al. | 370/389 |
| 6,370,148 B1 | 4/2002 | Calvignac et al. | |
| 6,404,756 B1 | 6/2002 | Whitehill et al. | |
| 6,487,213 B1 * | 11/2002 | Chao | 370/418 |
| 6,553,027 B1 * | 4/2003 | Lam et al. | 370/386 |
| 6,567,428 B1 | 5/2003 | Rubin et al. | |
| 6,570,873 B1 | 5/2003 | Isoyama et al. | |
| 6,580,720 B1 | 6/2003 | Francis et al. | |
| 6,667,955 B1 | 12/2003 | Blanc et al. | |
| 6,728,243 B1 | 4/2004 | Jason, Jr. et al. | |

FOREIGN PATENT DOCUMENTS

| | | |
|---|---|---|
| EP | 0 507 044 A2 | 10/1992 |
| EP | 0 868 054 A2 | 9/1998 |
| EP | 0869651 A1 | 10/1998 |
| EP | 1 096 387 A1 | 5/2001 |
| WO | WO 98/19439 | 5/1998 |
| WO | WO 99/26381 | 5/1999 |
| WO | WO 00/29956 | 5/2000 |

OTHER PUBLICATIONS

IEEE Transactions on Parallel and Distributed Systems, vol. 4, No. 1 1993, "Symmetric Crossbar Arbiters for VLSI Communication Switches", pp. 13-27.

Brauss, S "Communication libraries for the Swiss-Tx Machines", EPFL-SCR No. 11 (http://www.grid-computing.net/documents/article3.pdf), Nov. 1999, 6 pages.

Maltz, D.A. et al. "MSOCKS: An Architecture for Transport Layer Mobility", ISBN: 0-7803-4384-0, vol. 3, Mar. 29, 1998, pp. 1037-1045.

Watson, R.E. et al. "The Parallel I/O Architecture of the High-Performance Storage System (HPSS)", ISBN: 0-7803-3098-6, vol. SYMP. 14, Sep. 11, 1995, pp. 27-44.

Gruber, R. and Dubois-Pelerin Y. "Swiss-Tx: first experiences on the T0 system", EPFL-SCR No.10 (http://www.grid-computing.net/documents/article1.pdf), Nov. 1998, 6 pages.

Boden, Nanette J., et al., "Myrinet: A Gigabit-per-Second Local Area Network," IEEE Micro, Feb. 1995, pp. 29-36.

Chun, Brent N., et al., "Virtual Network Transport Protocols For Myrinet," IEEE Micro, vol. 18, No. 1, Jan./Feb. 1998, pp. 53-63.

Chun, Brent N., et al., "Virtual Network Transport Protocols for Myrinet," Computer Science Division, University of California at Berkeley, Aug. 20, 1997, pp. 1-4.

Dally, William J., "Virtual-Channel Flow Control," IEEE, 1990, pp. 60-68.

Eng, Kai Y., Hluchyj, Michael G., and Yeh, Yu-Shuan, "A Knockout Switch for Variable-Length Packets," IEEE Journal on Selected Areas In Communications, vol. SAC-5, No. 9, Dec. 1987, pp. 1426-1435.

Gruber, Ralf and Sawley, Marie-Christine, "SWISS-TX, Un Projet D'Entrepreneurs," EPFL Flash Informatique, Jul. 1998, 6 pages.

Karol, Mark J., "Input Versus Output Queueing on a Space-Division Packet Switch," IEEE Transactions on Communications, vol. COM-35, No. 12, Dec. 1987, pp. 1347-1356.

Kronenberg, Nancy P., et al., "VAXclusters: A Closely-Coupled Distributed System," ACM Transactions on Computer Systems, vol. 4, No. 2, May 1986, pp. 130-146.

Mainwaring, Alan and Culler, David, "Active Message Applications Programming Interface and Communication Subsystem Organization," Draft Technical Report, Computer Science Division University of California at Berkeley, Technical Report UCB CSD-96-918, Oct. 1996, pp. 1-45.

Mainwaring, Alan and Culler, David "Design Challenges of Virtual Networks: Fast, General-Purpose Communication," ACM SIGPLAN Symposium on Principles and Practice of Parallel Programming (PPOPP), Atlanta, GA, May 4-6, 1999.

Pakin, Scott, et al., "Fast Messages: Efficient, Portable Communication for Workstation Clusters and MPPs", IEEE Concurrency, Apr.-Jun. 1997, pp. 60-73.

Scott, Steven L., "Synchronization and Communication in the T3E Multiprocessor", Cray Research, Inc., 1996, pp. 26-36.

Scott, Steven L. and Thorson, Gregory, M., "The Cray T3E Network: Adaptive Routing in a High Performance 3D Torus", HOT Interconnects IV, Stanford University, Aug. 15-16, 1996, pp. 1-10.

Tamir Yuval and Chi, Hsin-Chou "Symmetric Crossbar Arbiters for VLSI Communication Switches", IEEE Transactions on Parallel and Distributed Systems, vol. 4, No. 1, 1993, pp. 13-27.

Sun Microsystems, Inc., "The Sun Enterprise Cluster Architecture Technical White Paper", 1997, pp. 1-74.

IBM, "JES2 Introduction", Document No. GC28-1794-02, Third Edition, Sep. 1997, pp. 1-51.

ANSI, "Information Technology—Scheduled Transfer Protocol (ST)", T11.1/Project 1245-D/Rev. 3.6, Jan. 31, 2000, pp. 1-97.

Martin Collier and Tommy Curran, "Path Allocation in a Three-Stage Broadband Switch with Intermediate Channel Grouping," INFOCOM '93, Proceedings Twelfth Annual Joint Conference of the IEEE Computer and Communications Societies, Networking: Foundation for the Future, IEEE, vol. 3, Mar. 28-Apr. 1, 1993, pp. 927-934.

Martin Collier and Tommy Curran, "Cell-Level Path Allocation in a Three-Stage ATM Switch," Communications, 1994, iCC 94, SUPERCOMM/ICC '94, Conference Record, Conference on Serving Humanity Through Communications, IEEE International, vol. 2, May 1-5, 1994, pp. 1179-1183.

* cited by examiner

PACKETS P0, P2 ARE DESTINED FOR O0
PACKETS P1, P3, ARE DESTINED FOR O1

METHOD AND APPARATUS FOR A PIPELINED NETWORK

BACKGROUND OF THE INVENTION

1. Field of the Invention

The present invention relates to networks, and, more particularly, to a pipelined network.

2. Description of the Related Art

Computer networks are an increasingly important part of both private and business environments. Computing devices such as workstations, personal computers, server computers, storage devices, firewalls and other computing devices function as nodes of a network with at least one network element connecting the computing devices. The various nodes transmit and/or receive various kinds of information over the network. The network may be a bus based, ring based, a switched network or a combination. Computing devices and users are demanding higher communication speeds across networks as more and more information flows across the various networks. The introduction of new technologies will likely load down networks even more.

There are numerous network architectures used to interconnect the various nodes. One common and familiar architecture is a local area network (LAN), which is generally a network within a single building or company campus. The rules by which nodes transmit and receive packet data are defined in various protocols. One common protocol utilized by LANs is defined in IEEE 802.3, also referred to as the Ethernet. Other protocols commonly utilized are ring-based protocols such as IEEE 802.5, referred to as a "token ring" protocol, which requires a special bit pattern, or "token" to circulate when nodes are idle, and which nodes remove before transmitting data packets.

A network protocol provides rules to route a packet of information from a source to a destination in a packet switching network. A packet is generally a portion of a message transmitted over a network that typically includes routing or destination information in addition to data information. Packets may vary in size from only a few bytes to many thousands of bytes.

The network protocol acts to control congestion when a resource conflict arises. Resource conflicts arise when network resources are simultaneously requested. The Ethernet (IEEE 802.3), for example, uses a bus-based broadcasting mechanism that allows nodes to transmit at any time. That can result in collisions on the bus. If, in Ethernet based networks, two or more packets collide, the nodes wait a random amount of time before re-transmitting. The sending node typically buffers packets until they are acknowledged because the packets might have to be retransmitted. Receiving nodes may also buffer packets.

The type of networks typically used for LANs however, cannot adequately support systems requiring low forwarding latencies and high communication bandwidth, such as distributed processing systems, in which storage resources as well as processing tasks may be shared.

In switched networks, similar considerations apply. In a switched network delays occur in the switches when congestion causes packets to be temporarily stored in buffer memories. Congestion arises when a path, internal or external to the switch, is requested to forward more packets than its capacity allows. Usually, it cannot be predicted how long congestion lasts. Thus, forwarding delays are variable and unpredictable. That complicates network design, in particular, it complicates the bookkeeping of outstanding packets and the scheduling of the network switches. Bookkeeping is complex since the number of outstanding packets can vary and since it can be difficult to decide whether a packet was lost or just delayed for a long time. Scheduling the switches is complicated since the routes of the packets cannot be known before the packets actually arrive making it necessary to calculate the routes "on the fly".

Another factor to be considered in trying to achieve an efficient network is that data transfers across most networks typically have wide variation in bandwidth and latency requirements. Latency and bandwidth define the speed and capacity of a network. Latency is generally the amount of time it takes for a packet to travel from its source to its destination. Bandwidth is the amount of traffic a network can carry in a fixed time, typically expressed in bytes per second. There can be conflicts between a desire for high bandwidth and low latency. For example, in a high speed data network that generally carries large sized data packets (e.g., 2K bytes), a small packet (e.g., 64 bytes) having low-latency requirements, can wait a long time for a large packet currently being transferred to complete. High-bandwidth network traffic with larger-sized packets can conflict with low-latency traffic with smaller-sized packets. Larger-sized packets increase the latency of smaller-sized packets, and smaller-sized packets can interfere with scheduling for larger-sized packets. The smaller-sized packets can prevent larger packets from fully utilizing available bandwidth.

It would be desirable to reduce complexity of network design by avoiding forwarding delays that are variable and unpredictable, avoid complicated bookkeeping related to outstanding packets and scheduling. It would also be desirable to accomplish reduced complexity and still provide higher throughput.

SUMMARY OF THE INVENTION

Accordingly, the invention provides a computer system coupled by pipelined network that includes a plurality of initiator nodes coupled to send packets into the network. A plurality of target nodes receive the packets sent into the network. The network uses a plurality of pipeline stages to transmit data across the network. Each pipeline stage consumes a known time period, which provides for a predetermined time period for transmission for each packet that is successfully sent from one of the initiator nodes to one of the target nodes. The pipelined network may be synchronous and the boundaries of all the pipeline stages are aligned. The pipeline stages include an arbitration stage to obtain a path through the network, a transfer stage during which a data packet is transmitted, and an acknowledge stage during which successful transmission of a packet is indicated by the target. To simplify network design, all the pipeline stages can be implemented so that they have equal length.

In another embodiment the invention provides a networked computer system that includes a plurality of processing nodes. The networked computer system further includes a synchronous pipelined switched network coupling the plurality of nodes, the pipelined network having a plurality of pipeline stages including at least an arbitration stage to obtain a path through the pipelined network, a transfer stage transferring data over the path and an acknowledge stage, each stage being of equal length. The networked computer system may further include a first switching circuit that couples the plurality of processing nodes and carries information transmitted during the transfer stage. The networked computer system may further include a second switching circuit coupling the processing nodes, which is independent of the first switching circuit and which carries at least a portion of pipeline operations simultaneously with transfer stage operations carried over the first switching circuit.

In still another embodiment the invention provides a method for transmitting information across a pipelined computer network. The method includes transmitting the information from an initiator node to a target node using a plurality of pipeline stages in the computer network. Each of the pipeline stages has a fixed forwarding delay. The pipelined network overlaps an operation in one pipeline stage with another operation in another pipeline stage. The method may further include requesting a path through the network from the initiator node to the destination node during an arbitration stage, sending the information in a transfer packet from the initiator node to the target node during one or more transfer stages and sending an acknowledge packet containing status of receipt of the transfer packet from the target to the initiator during one or more acknowledge pipeline stages. The method may further include having the arbitration logic check during the arbitration stage with the destination node to determine if the destination node can accept a packet from the initiator node before granting a requested path during the arbitration stage.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
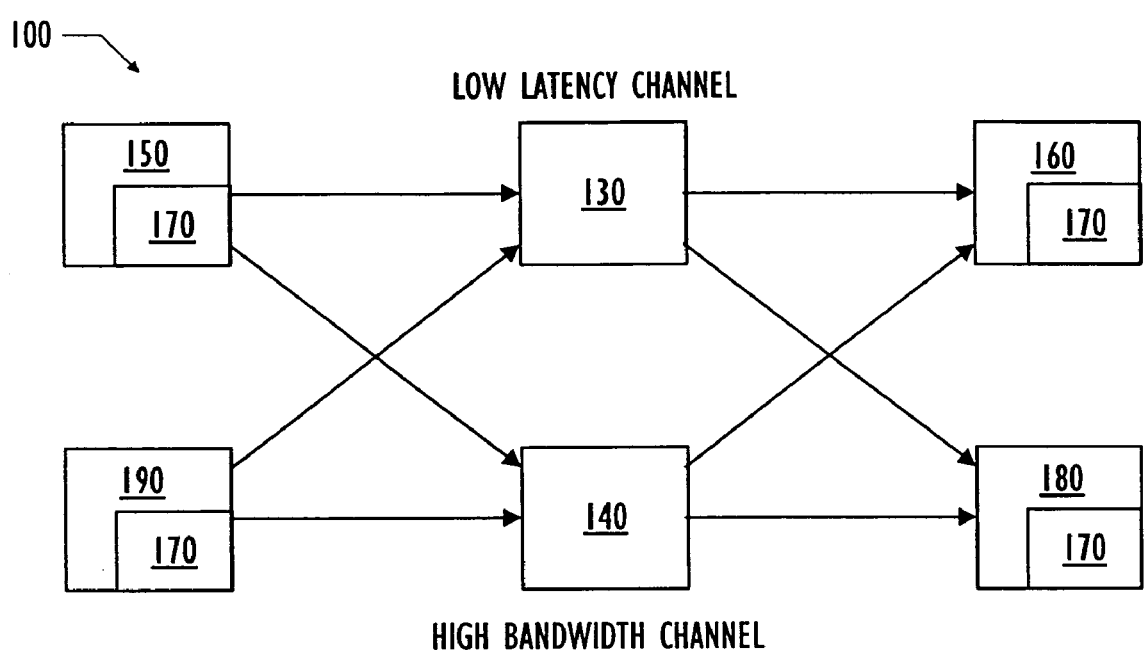
FIG. 1 is a block diagram showing a data network with two transmission channels.

Referring to FIG. 1, a block diagram describes a data network system according to an embodiment of the present invention. Data network system 100 is a network separated into at least two channels 130 and 140. The two channels 130 and 140 are separate physically and logically. Data network system 100 includes a plurality of nodes 150, 160, 180, and 190 coupled to channels 130 and 140. Although four nodes are shown, one of skill in the art appreciates that the number of nodes is not limited to four, and may be altered according to system design requirements. Each of nodes 150, 160, 180 and 190 optionally are computing devices, such as workstations, personal computers, and server-type computers or other devices that may be coupled to a network such as storage devices and input/output devices. The nodes may be coupled into a distributed computing system through channels 130 and 140.

Each channel transmits data packets having predetermined characteristics or criteria. For example, channel 130 may transmit data packets identified as meeting a low latency criteria. That is, the data packets need to get to their destination with a relatively short delay. Such low latency packets could be, e.g., system management packets providing information related to operating conditions of data network system 100. In contrast, channel 140 may transmit data packets identified as requiring a high bandwidth, which are typically large data packets that have relaxed latency considerations. Each channel is optimized for transmitting a type of packet, thereby avoiding limitations in the network that occur due to mixing of different packet types. Thus, assuming channel 130 transmits low latency packets and channel 140 transmits high bandwidth packets, segregating packets with low latency and high bandwidth requirements onto separate physical channels results in better bandwidth for the high bandwidth traffic and better latency for the low latency traffic. Note however, each channel may still be capable of transmitting other types of packets that are not optimized for the particular channel. Additionally, other types of packets not suited for either channel may be transmitted across a third channel.

A data network system having at least two channels, such as that shown in FIG. 1, selects data for transmission over an appropriate one of the channels based on various criteria described above, such as latency and bandwidth requirements for the data being transferred. Data that is transferred over the network may include various kinds of data information such as user data, kernel data, and operating system data. The data information may include system information relating to system management, error conditions and the like. That data information may be sent over either the high bandwidth or the low latency channel depending on, e.g., the data packet length or type of operation associated with the data. The low latency channel also carries control information related to network protocol. Network protocol information may include requests and grants for transmission of a data packet or packets across the network as well as acknowledge packets as described further herein. The system thus selects data information and control information for transmission across an appropriate one of the channels according to the selection criteria described herein.

Desired bandwidth and latency characteristics of packets are only examples of characteristics which can be used to select a channel for transmission. Packets may be selected for transmission across one of the channels according to various criteria such as size of a data information packet, type of operation associated with the data information packet, a latency budget for the data information packet, security needs of the data information packet, reliability needs of the data information packet, as well as scheduling strategies of the various channels, e.g., highly scheduled versus limited scheduling, buffering requirements, and error parameters.

Channels can be optimized to carry traffic based on the various criteria in addition to bandwidth and latency. That is, channels can be designed to transport traffic having one or more of the above described criteria. Thus, if other criteria, such as reliability or security are being used, the channels may be optimized differently from the high bandwidth channel and the low latency channel to accommodate such traffic. For example, for traffic having higher reliability needs, a channel can be designed to include a forward error correction scheme that can detect and correct a significant number of expected errors. Thus, an important transfer, e.g., reconfiguration information, may be assigned to the most reliable channel. For simpler reliability needs, a channel can use parity, a checksum, or a cyclic redundancy check (CRC) scheme to detect errors. In addition, security concerns may be addressed by providing a channel that is more physically secure, providing, e.g., detection capability if security of the channel has been compromised. In addition, more complex encryption algorithms may be utilized on a channel designed to accommodate traffic with higher security needs. The channels can of course be designed to carry traffic having one or more of the criteria described herein. For example, a high bandwidth channel may also be designed to provide higher security.

Each of channels 130 and 140 schedule transmissions of data packets through data network system 100 according to requirements of the respective identified features of groups of data packets. Channel 130, which is designed to transmit low latency packets, uses limited scheduling because an efficient channel transmitting low latency packets requires quick scheduling decisions. Additionally, low latency packets are typically smaller-sized packets that do not cause long lasting blockages. The transmission error rate, therefore, may be of less concern for low-latency channel 130 because an error affects a relatively short data transfer. Therefore, retransmission of a packet that had a transmission error has an acceptable overhead.

On channel 130, the scheduling may be accomplished by allocating a transmission path across the network as the packets arrive in the data network. Assuming a switched data network, the packet or packets may be transmitted to a switch, whereupon switch control logic allocates a transmission path through the switch. The transmission path information, i.e., a desired destination, is typically contained in the packet, commonly in a header or first few bytes of the packet. At the input to the switch the header information is provided to appropriate switch control logic, which allocates a transmission path to the data packet associated with the transmission path.

As described, channel 140 carries high bandwidth data packets. To maximize the bandwidth, channel 140 operates with more scheduling. In contrast to low latency channel 130, channel 140 is carefully scheduled to maintain a constant flow of data packets. Channel 140 is designed for transmitting larger-sized packets that can cause longer lasting blockages and that can tolerate increased latency. Longer packets generally have lower overhead than shorter packets on a per byte basis. Therefore, channel 140 has a higher effective throughput of information. Additionally, channel 140 preferably may have a lower error rate than would be acceptable on channel 130. That is because an error on channel 140 typically affects a relatively large data transfer causing considerable overhead in case retransmission of a packet is required.

High-bandwidth channel 140, which may be scheduled more carefully than low-latency channel 130, can be scheduled prior to transmitting data packets to the data network. Assume the selection criteria determining over which channel to transmit data is based on data packet size. For those packets that are determined to meet the size criteria, the packets are transmitted with a high degree of scheduling to ensure high utilization of channel 140. The channel transmitting the larger sized data packets may be a highly scheduled channel, a synchronous channel, a pipelined channel, or a channel having those or any combination of those qualities suited for transmitting larger sized data packets as discussed herein.

The dual channel architecture described herein is particularly well suited to meet the communication needs of a cluster. A cluster is a group of servers or workstations that work collectively as one logical system. One advantage of clustering is high availability and high performance. Clusters capitalize on economies of scale and are inexpensive alternatives to other fault tolerant hardware-based approaches as well as to other parallel systems such as symmetric multi-processors, massively parallel processors and non-uniform memory architecture machines. The dual channel architecture described herein can guarantee low latency, even under heavy load. Low latency facilitates tight coupling between the nodes of a cluster.

Figure 2:
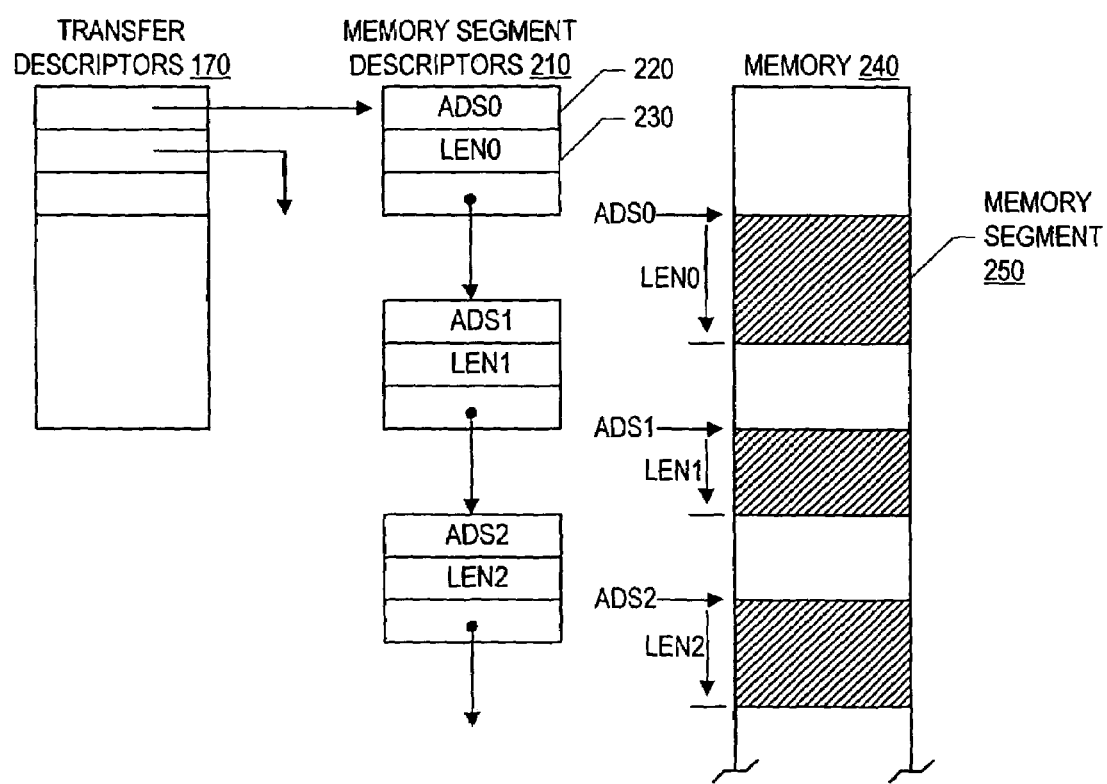
FIG. 2 is a block diagram of the data structures used by a network interface.

One way to increase efficiency of the system illustrated in FIG. 1 with relation to use of high bandwidth channel 140 is illustrated in FIG. 2. According to one embodiment, channel 140 allocates resources prior to allowing data packets to leave their respective nodes. Sending node 150 and receiving node 160 each set up transfer descriptors 170. As shown in FIG. 2, transfer descriptors 170 point to linked lists of memory segment descriptors 210, which include an address descriptor 220 and a length descriptor 230. The address and length descriptors provide a starting address and the length of the memory segment 250 located in memory 240. Each sending node 150 and receiving node 160 sets up transfer descriptors 170 prior to transferring data packets into the data network system. Thus, after a transfer begins, which may involve multiple data packets, data to be sent to receiving node 160 can efficiently be gathered from memory 240 within the sending node 150, and data that is received from the network can efficiently be delivered to memory 240 within the receiving node 160 according to transfer descriptors 170.

As described above, in one embodiment, packet size provides one of the criteria used to select whether traffic should be transmitted over low latency channel 130 or high bandwidth channel 140. Large packets are transferred over one transmission channel, a high bandwidth channel, and small packets are transferred over another transmission channel, a low latency channel. The sending node determines whether a particular packet should be transferred over low latency channel 130 or high bandwidth channel 140. The exact criteria for whether a packet is considered large or small depends on system design requirements. For example, a particular system may require that the transfer be of at least a predetermined threshold size in bytes (e.g., 512 bytes) to be transferred on high bandwidth channel 140 and employ appropriate safeguards to ensure that threshold is met in software or hardware or both. According to that embodiment, all other packets are transmitted across the low latency channel. That threshold may be fixed or programmable. It is possible for a threshold to be adjusted based on static or dynamic considerations such as size of the network or network loading.

A channel optimized for transmitting smaller-sized packets could become overloaded if packets are transmitted through the channel that are outside a specified size range. In one embodiment, the packet size for the low-latency channel 130 is 64 bytes or less. Thus, a system may transmit all data capable of being formed into packets of 64 bytes or less over the low-latency channel 130 and all other packets are transferred over high bandwidth channel 140. In some embodiments, packet size may be fixed. For example, all packets are either 1024 or 64 bytes.

In some systems, application software or system software may make some or all of the determinations as to whether a packet is appropriate for the low-latency channel 130 or the high bandwidth channel 140. The application software or system software, after making its determination, sends a packet to an appropriate channel or channel queue based on that determination. If application or system software is responsible for selecting a channel to transmit its packets, there is an expectation that such software is well behaved in that it will not unduly load down the low-latency channel 130 by sending packets at a high rate. Hardware can be used to rate-control access to the low-latency channel.

Application programs or other system software may use other criteria to allocate a particular packet to either the low-latency channel 130 or the high bandwidth channel 140. For example, the application software may choose a channel based on the type of operation being performed by the packet being transmitted. For example a synchronization packet for a synchronization operation such as an atomic read-modify-write or a fetch-and-increment operation, which require atomic access to memory locations during the operation, typically would benefit from low-latency transmission across the network. Therefore, packets associated with such operations may be sent to the low-latency channel 130 based on the type of operation being performed without consideration of packet size. System management information for the distributed system or network related to error conditions, configuration or reconfiguration, status or other such information may also be selected for transmission across the low-latency channel 130, without, or in addition to, consideration of packet size.

In addition to the type of operation, the type of "notification mechanism" used on arrival of a packet may provide another criteria for channel selection. For example, a network interface to low-latency channel 130, may raise an interrupt on receipt of a packet since the message on that channel may be assumed to be urgent. On the other hand, after a node receives a packet from the high bandwidth channel 140, the arrival of the packet may be entered in a notification queue that is periodically polled. Further, the security level of a channel may provide still another criteria for channel selection. If one channel can transmit information more securely than the other channel, then information that requires secure communication is selected for the more secure channel.

One of skill in the art appreciates that any combination of the above criteria and other criteria appropriate for a particular system may be used to select a channel for transmission of any particular packet. Note that a system could be implemented such that the system or application software may choose to send a packet across the low-latency channel 130 or the high bandwidth channel 140 despite the presence of criteria normally causing the packet to be sent on the other channel.

In one embodiment, the dual channel architecture illustrated in FIG. 1 can be utilized effectively for accessing a disk storage system. Data retrieved from or written into the disk storage system tends to be the type of traffic suitable for high bandwidth channel 140. Disk scheduling, in which appropriate commands are provided related to the type, amount and location of disk access is well suited to be carried over the low-latency channel 130. Thus, high bandwidth channel 140 carries the bulk disk transfers and low-latency channel 130 carries appropriate disk commands.

The network system 100 described above may be, e.g., bus-based, ring-based, switch-based or a combination. The data network system 100 optionally includes at least one switch coupled to the receiving and sending nodes 150, 160, 180, and 190. According to an embodiment of the present invention, one of the switches is a non-blocking buffer-less switch. Alternatively, each of channels 130 and 140 uses switches that may or may not be buffer-less and may or may not be blocking-type switches. In an exemplary embodiment, the switches are configured according to the channel requirements. For example, a channel optimized to transmit highly scheduled high bandwidth packets includes a non-blocking buffer-less switch, as more fully described below. A channel optimized to transmit low latency data optionally may include a switch that allows blocking of packets.

Figure 3:
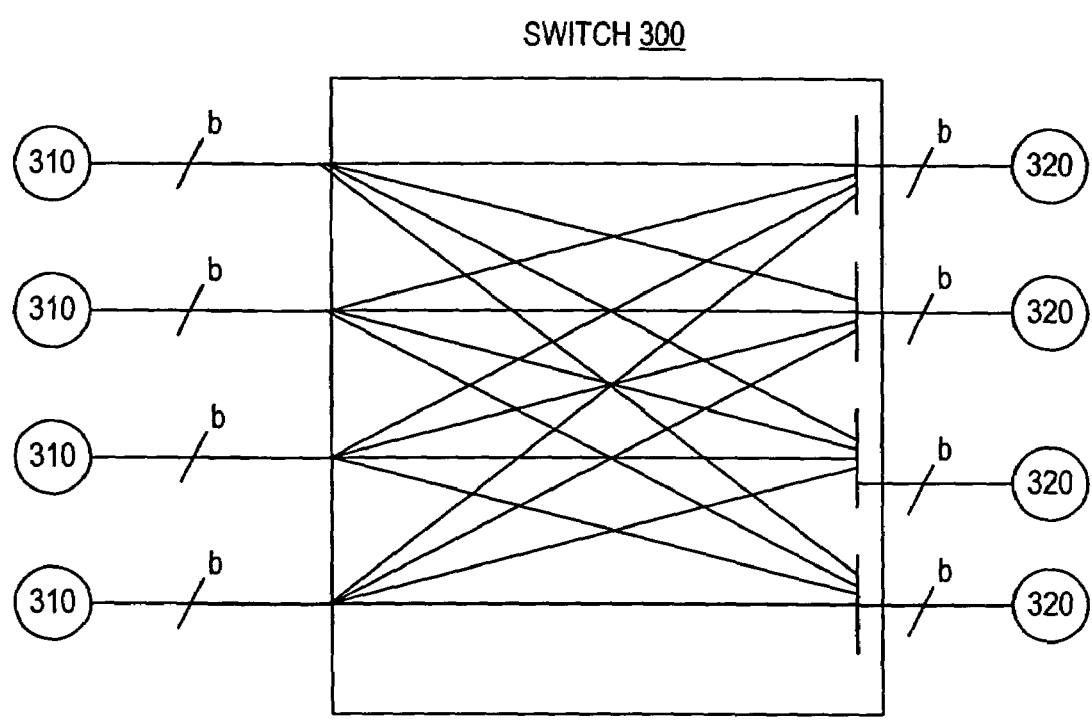
FIG. 3 is a block diagram of a switch suitable for an embodiment of the present invention.

One type of switch appropriate for an embodiment is shown in FIG. 3. Referring to FIG. 3, a block diagram shows a crossbar switch 300. Each of input ports 310 is coupled to each of output ports 320. Assuming each input port 310 and each output port 320 have the same bandwidth "b," resource conflicts can arise. According to an embodiment, if no buffer memory is present in the switch 300 to temporarily store data packets, and multiple data packets are simultaneously forwarded to one of output ports 320, switch 300 drops data packets.

One method of preventing conflicts requires an input buffer memory or output buffer memory to temporarily store packets. An input buffer holds a data packet in an input buffer coupled to the switch 300 and prevents the data packet from entering the switch 300 until a desired one of the output ports 320 is available. Similarly, output buffering avoids conflicts by providing an output buffer memory with enough input bandwidth to allow packets to be received simultaneously from all input ports 310. One or more channels using a switch with input or output buffers is within the scope of the present invention.

Figure 4:
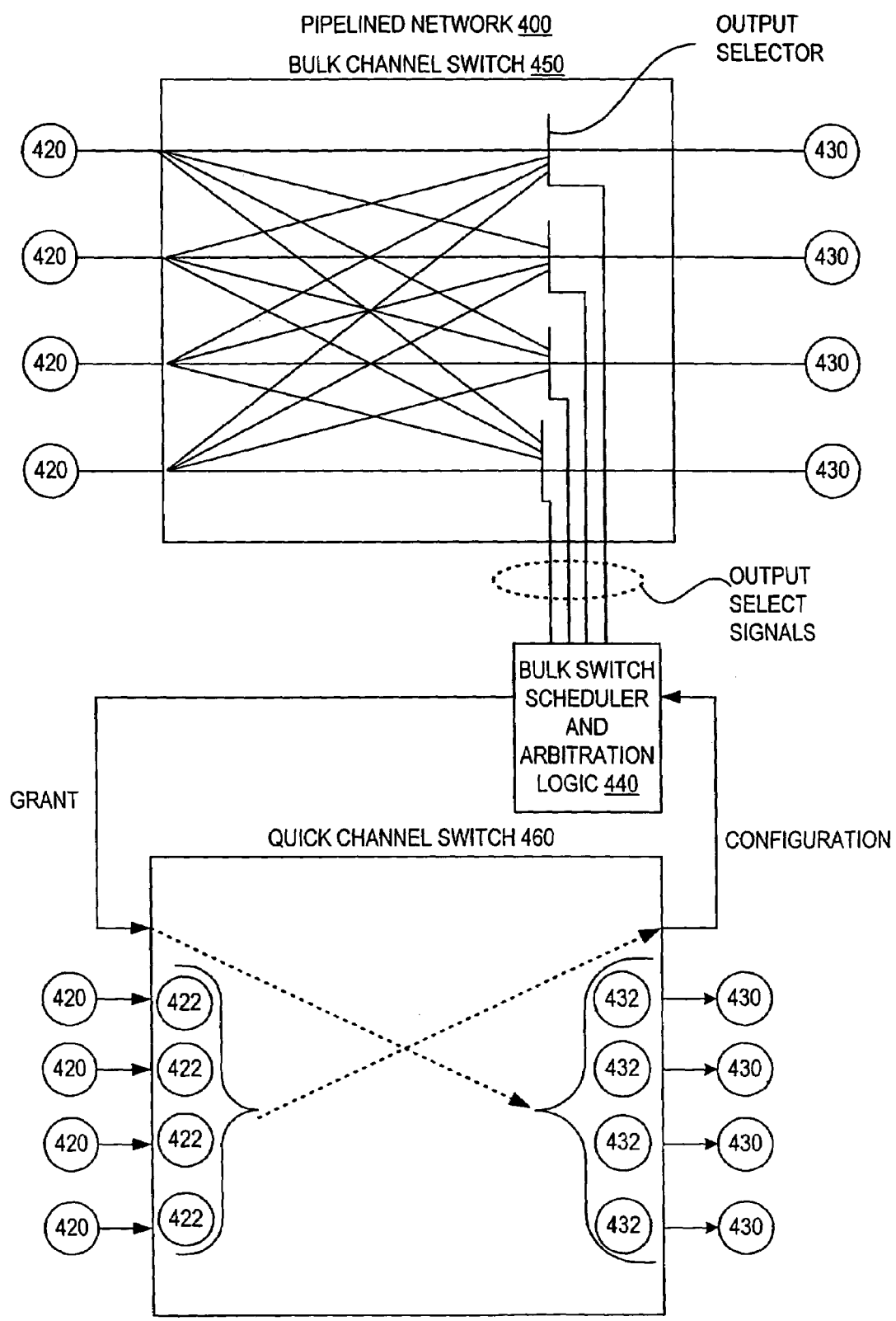
FIG. 4 is a block diagram of a representative network including two buffer-less switches and a switch scheduler and a plurality of network nodes according to an embodiment of the present invention.

Referring now to FIG. 4, a block diagram illustrates an exemplary switched data network embodiment employing two buffer-less switches, each switch transmitting packets for a different type of channel. In the embodiment, the switches are coupled to switch scheduler 440. In the embodiment, a channel for transmitting high bandwidth, larger-sized packets is represented by high bandwidth or bulk channel switch 450, which may be a flow-through switch. A channel for transmitting low latency, smaller-sized packets is represented by low-latency or quick channel switch 460.

More specifically, the switched data network shown in FIG. 4 includes bulk channel switch 450, which is a non-blocking buffer-less switch. Switch 450 is coupled to a switch scheduler shown as bulk switch scheduler 440. Quick channel switch 460 is also shown coupled to the bulk switch scheduler 440 for reasons described further herein. Quick channel switch 460 operates as a low latency channel designed to efficiently transmit low latency packets.

Note that each node may include separate buffers or queues for the different nodes. In fact, each node may include separate send and/or receive queues for each node on the switch. For example, if the switch has 16 ports, 16 separate input and 16 separate output queues may be maintained per node.

The nodes 420 coupled to the switches 450 and 460 transmit information packets organized into different groups according to predetermined criteria and transmit the groups via independent transmission channels for each group. Nodes 420 and 430 are coupled to each transmission channel, i.e., the bulk channel switch 450 and the quick channel switch 460. Each node of the network typically has an input node 420 and an output node 430 for respectively sending and receiving information packets. The quick channel switch 460 representing a low latency channel, transmits information packets that are predetermined to efficiently transmit across a low latency channel. For example, the size of the data information packets could be an appropriate size for the quick channel switch 460. Alternatively, a type of operation or latency budget could require that the packets be transmitted across the quick channel switch 460. In one embodiment, the quick channel switch 460 transmits control information to the nodes 420 and 430, such as grants and requests for transmitting packets across the bulk channel switch 450.

In one embodiment, the bulk channel has a bandwidth that is an order of magnitude larger than the quick channel to accommodate the desire to provide high bandwidth transfers over that channel. For example, the bulk channel may have a full-duplex bandwidth of 2.5 Gbits/second between nodes and the quick channel has a full-duplex bandwidth of 0.66 Gbits/second. If each switch has 16 ports, the bulk switch has an aggregate bandwidth of 40 Gbits/second and the quick switch has an aggregate bandwidth of 10.56 Gbits/s. A link connecting a node with the switch may include two physically separate cables that implement the bulk channel and the quick channel. Data directions are separated in that each full-duplex channel is realized with two pairs of wires. Standard FibreChannel/Gigabit Ethernet transceivers may be used to drive both the quick channel and the bulk channel.

This embodiment is also suitable for configurations in which the bulk channel switch 450 has an optical interconnect or an optical switch or both, which may make transfer of control information difficult. Using a separate channel for routing control information allows the bulk channel to benefit from the higher speeds of an optical configuration. In addition, if an optical interconnect and switch are utilized for both the bulk and quick channel, wavelength may be used to distinguish a low latency channel from a high bandwidth channel in addition to distinguishing the output ports.

In one embodiment, the quick channel is utilized for scheduling of the bulk channel switch 450. In the embodiment, two types of packets are transmitted across the quick channel to schedule bulk channel 450, a request-type packet and a grant-type packet. The bulk channel transmits bulk packets of equal size, each bulk packet being transmitted in a "bulk frame." A bulk frame refers to the time required to transmit a bulk packet. During each bulk frame time period, the quick channel transmits a request packet from each node 420 to the quick channel switch 460 and in response, a grant packet is sent from the quick channel switch 460 to each node 420. Each request packet contains bit vectors that indicate which nodes 430 have been requested by which nodes 420. A single one of the nodes 420 may request multiple nodes 430. A received grant packet indicates which of the requests was granted.

In one embodiment, as described further herein, quick channel switch 460 has minimum scheduling overhead and no buffering, resulting in dropping of packets when collisions occur. The lossy nature of the quick channel in such an embodiment could lead to unwanted loss of request and grant packets resulting in loss of bulk channel bandwidth. However, request and grant packets are treated in a manner that avoids such dropping. More particularly, request packets are forwarded directly from the input ports 422 of quick channel switch 460 to the switch scheduler 440 without passing through the switching fabric of quick channel switch 460 (i.e., without passing through the output ports connected to the other nodes). The scheduler 440 is capable of receiving request packets from each of the nodes 420 simultaneously. That configuration avoids collisions within the switching fabric and the potential of dropping request packets.

Conversely, the switch scheduler 440 transmits grant packets generated in the arbitration logic within the switch scheduler 440 to output ports 432 of the quick channel switch 460. The grant packets may collide with other packets that are simultaneously forwarded to the output ports of the quick channel. Due at least in part to the important nature of the grant packets for scheduling the bulk channel switch 450, the grant packets are prioritized in the event of a collision. Thus, if a collision with a grant packet occurs in quick channel switch 460, the grant packets are given higher priority and are forwarded and other packets are dropped. The quick channel switch 460 sends the grant packets simultaneously to all nodes at a predetermined time within a bulk frame time period. That predetermined time is known by all nodes in the network. Thus, the nodes can avoid collisions with the grant packets by avoiding transmittal of any packets during the time periods predetermined to be assigned to grant packets, to better optimize use of quick channel 460.

If it is desired to minimize wire and pin counts, quick channel switch 460 may be implemented as a serial switch, in which either the ports and/or the internal data paths through the switch are serial. Bulk channel switch 450 may also be realized as a switch in which ports as well as internal data paths are serial. In other implementations one or both of the ports and internal data paths of bulk channel switch 450 may be parallel. Note that in one embodiment bulk channel switch 450 does not need to resample data and can be realized as a switch with all combinational logic (e.g. multiplexers). That is, it has no clocked logic in the form of buffers or registers.

Many different arbitration schemes may be utilized to schedule the bulk channel. In one embodiment, the arbitration scheme allocates output ports as a function of the number of requests being made by an input port. Those input ports making the fewest requests are scheduled first. In another embodiment, the arbitration scheme may allocate output ports based on the number of requests being made for a particular output port. Those output ports with the fewest requests are allocated first. A round robin scheme can also be used by the arbiter to avoid starvation in conjunction with those embodiments. Further details on an arbiter which may be used in some or all of the embodiments described herein, are described in the patent application entitled "Least Choice First Arbiter", naming Nils Gura and Hans Eberle as inventors, application Ser. No. 09/540,729, filed the same day as the present application and which is incorporated herein by reference. Of course, one of ordinary skill would understand that many other arbiters are known in the art and may be utilized in the various embodiments described herein.

In an embodiment, a precalculated schedule is established before the bulk scheduler/arbiter does its work. It is precalculated either by one of the nodes in the form of a centralized scheduler or by all the nodes in the form of a distributed scheduler.

The precalculated schedule may be used to implement quality of service (QoS), e.g., transmission of audio or video streams. The source of the stream asks the scheduler to periodically reserve a switch slot. For example, if the link bandwidth is 2.5 Gbits/s and the stream requires a bandwidth of 2.5 Mbytes/s, the source of the stream asks the scheduler to reserve 1 slot every 1000 bulk frames.

The precalculated schedule may be communicated to the bulk scheduler 440 with the help of the request packets. For every slot on bulk channel switch 450 the scheduler receives one request packet from every node. That request packet contains an additional vector of prescheduled targets. The bulk scheduler uses that information in that the scheduler does not schedule the output ports that are already reserved by the precalculated schedule. While the precalculated schedule is required to be conflict-free, the bulk scheduler does check whether this is the case to ensure that collisions are avoided due to an erroneous precalculated schedule.

The precalculated schedule allows for multicast. That is one reason why the request packet contains a vector. The vector specifies to which target or targets the initiator will send a bulk packet.

In one embodiment, bulk channel switch 450 together with nodes 420 and 430 form a pipelined network, the quick channel switch 460 contributing to pipelining through request and grant packets described above. The exemplary embodiment provides efficient transfers of data in distributed computing environments due to efficient use of the bulk channel and the quick channel to provide both high bandwidth transfers and low latency transfers without interfering with each other. Further, offloading some of the overhead for the bulk transfers, e.g., by having the request and grant transmissions occur on the low latency channel, further increases effective throughput of data on the bulk channel and simplifies the implementation of the high-speed bulk switch 450.

Figure 5:
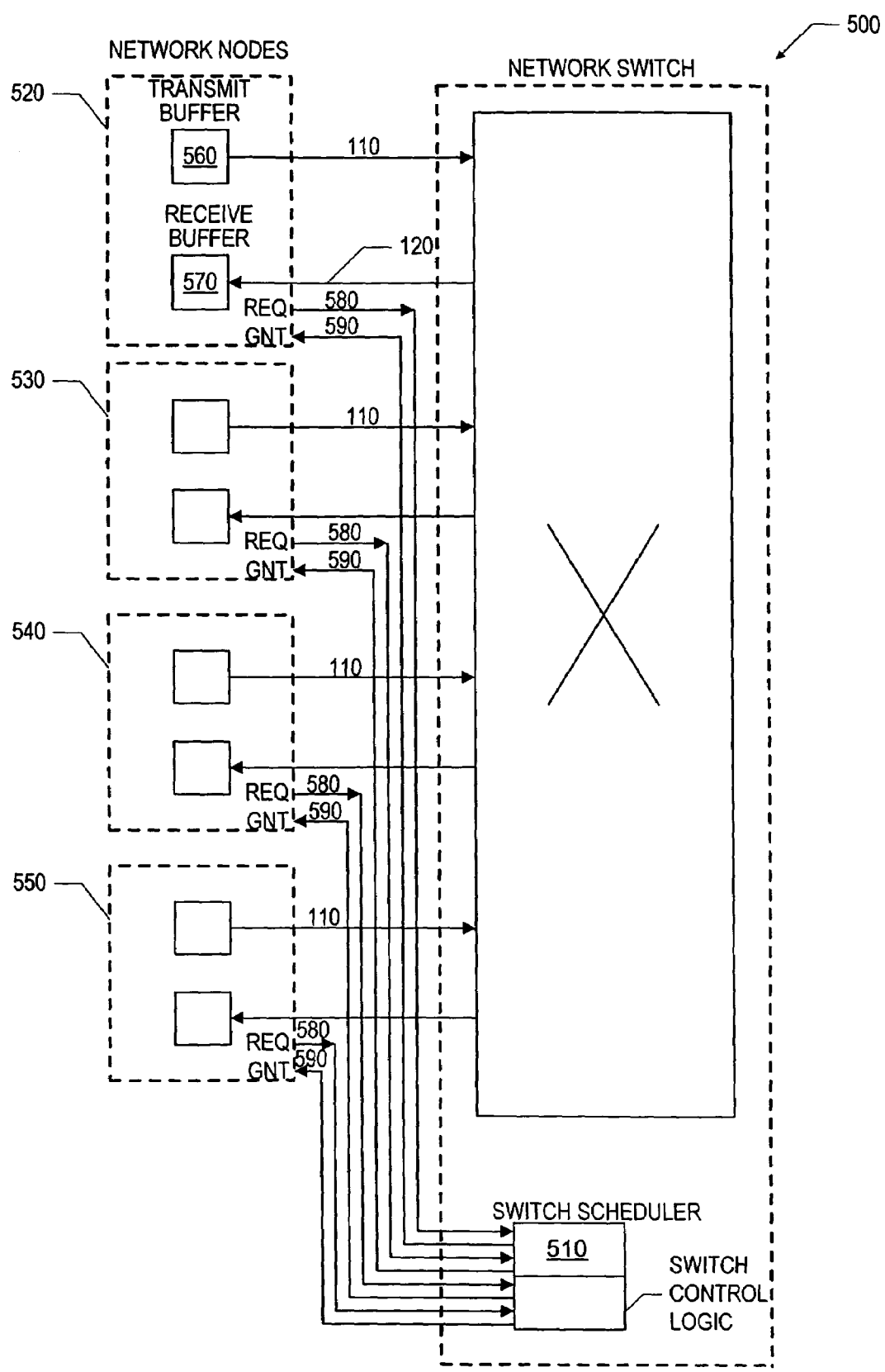
FIG. 5 is a block diagram illustrating a bufferless switch in accordance with an embodiment of the present invention.

Referring now to FIG. 5, a block diagram shows a non-blocking buffer-less switch 500 that is appropriate for implementing bulk channel switch 450. The term "buffer-less" refers to the fact that the switch provides no buffers for temporarily storing packets or portions of packets in case there are conflicts during a transfer for a particular switch resource, typically an output port. To avoid conflicts, non-blocking buffer-less switch 500 includes a switch scheduler 510 that controls the scheduling of packets to and from each of network nodes 520, 530, 540 and 550. Although switch scheduler 510 is shown coupled to only the nodes and to the non-blocking buffer-less switch 500, those of ordinary skill appreciate that the switch scheduler alternatively could be coupled to additional channels and switches.

Main memories within the nodes may provide buffering for data packets. Thus, network node 520 includes receive buffer 570 and transmit buffer 560 within a computer system memory. The computer system memory is coupled to a network interface within the computer system that stores a portion of the transmit and receive buffers, as more fully described below. In an exemplary embodiment, the network interface has sufficient storage for at least one data packet to be sent, the packet filling one bulk frame time period. In addition, a network interface may include a buffer sufficient to hold at least one data packet received from the network. The network interface within each node receives commands from switch scheduler 510 governing when to send data packets.

According to another embodiment, each network node 520, 530, 540, and 550 includes multiple storage queues. Thus, each network node includes a queue for sending packets and a queue for receiving packets, or, alternatively, one or more send queues and receive queues. Thus, each input port couples to a queue and each output port couples to a queue. Each queue disposed within each network node may include a portion of the queue within a network interface. Advantageously, having multiple send queues provides more choice when establishing connectivity between input ports and output ports and thereby increasing efficiency of the network.

The switched data network illustrated in FIG. 5 requests permission to transmit a packet through a buffer-less switch 500. More specifically, the request for permission includes communicating with switch scheduler 510 via signal REQ 580. In response, switch scheduler 510 provides one of a grant or a denial of permission via signal GNT 590.

The data packet is transferred through the buffer-less switch in an assigned transmission slot. Because there are no buffers in the switch to resolve conflicts, forwarding delays through the switch are fixed. That is, it takes a fixed amount of time for a packet to cross the switch. Being buffer-less does not imply that there can be no storage elements in the switch, it simply means that any switch storage elements that are present do not provide buffering resulting in variable transmission delays through the switch. Thus, any time a portion of a packet is stored in the switch, it is stored for a fixed amount of time before it is forwarded on. That simplifies scheduling of the switch.

An assigned transmission slot is received from the switch scheduler 510 via GNT 590. The requests via REQ 580 and grants via GNT 590 may be transmitted through separate physical media (one embodiment of which is shown in FIG. 4). A number of different signaling approaches for REQ and GNT signal may be utilized. For example, such signals may be provided on discrete signal wires or be transmitted via the switch itself. In addition, the media used for the requests and grants does not have to match the media of the balance of the network. One of ordinary skill appreciates that any viable communication media may be adapted for the purpose described. For example, the media including wire, wireless, optical fiber, or twisted pair are appropriate media for the grant and request lines, or for the network itself.

The nodes of switched data network 500 queue the data packets outside the buffer-less switch 500. For example, node 520, which is optionally a computer system, queues the information to be transferred on the network within a main memory and also within a network interface coupled to the memory. In one embodiment, the memory is a main memory coupled to the network interface and the buffer-less switch 500 via an interconnect such as a bus.

Switch scheduler 510 controls transmit buffer 560, which may be implemented as a queue, and which is coupled to the buffer-less switch 500. The switch scheduler 510 grants requests for transmittal of at least one of a plurality of data packets. In an embodiment, the switch scheduler 510 globally schedules each node coupled to buffer-less switch 500. Thus, for example, if node 520 requests to transmit a packet, the switch scheduler 510 grants the request by assigning a transmission slot to the requesting node 520. All nodes coupled to the buffer-less switch request transmission slots for transmitting through the buffer-less switch 500.

Figure 6:
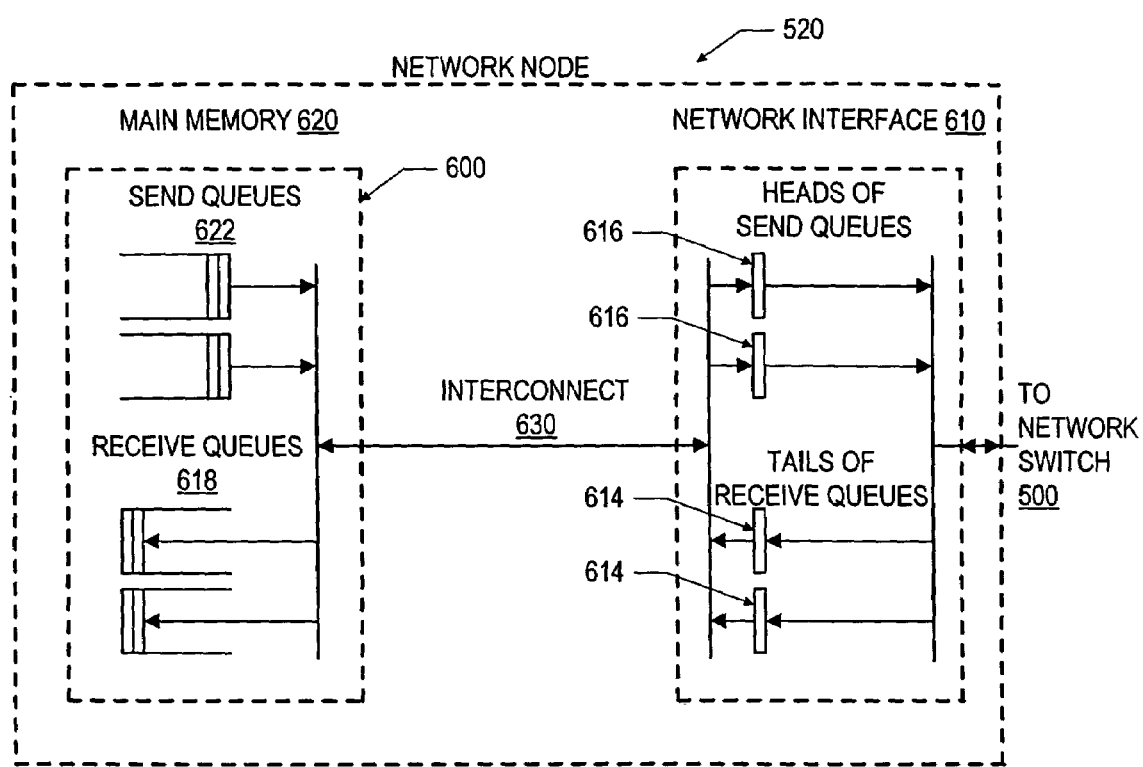
FIG. 6 is a block diagram illustrating aspects of a network node according to an embodiment of the present invention.

Referring to FIG. 6, node 520 is shown in further detail. Node 520 stores a minimal portion of queues 600 within network interface 610, which is within node 520 and coupled to the buffer-less switch 500. Node 520 stores another major portion of the queue within memory 620. In an embodiment, the network interface 610 stores end portions 614 of one or more receive queues 618 and stores leading portions 616 of one or more send queues 622. The network interface 610 holding the leading and the end portions couples to the send queues 622 and the receive queues 618, respectively, via an interconnect 630, the send queues 622 and the receive queues 618 being in memory 620.

The interconnect 630 coupling the network interface 610 and the memory 620 may have unpredictable availability for transfers to and from network interface 610 due to conflicting demands for the interconnect and the scheduling strategy chosen for interconnect 630. That is particularly true if interconnect 630 is a major system input/output bus for the node 520. Thus, placing a minimal portion of the queues 600 in the network interface 610 lessens the probability that delays caused by unavailability of interconnect 630 will result in delays on network switch 500. Interconnect 630 may also be a point to point connection with predictable availability. If so, delays and unpredictability on interconnect 630 may not be a factor.

Preferably, node 520 is one node in a switched data network that includes several network nodes coupled to the network switch. Each node is optionally a computer system including a processor and a memory coupled to the processor or other appropriate system, such as a storage or input/output node. The connection between the nodes and the network switch is optionally a wire, a wireless transmission medium or other appropriate connection depending on system requirements.

Figure 16:
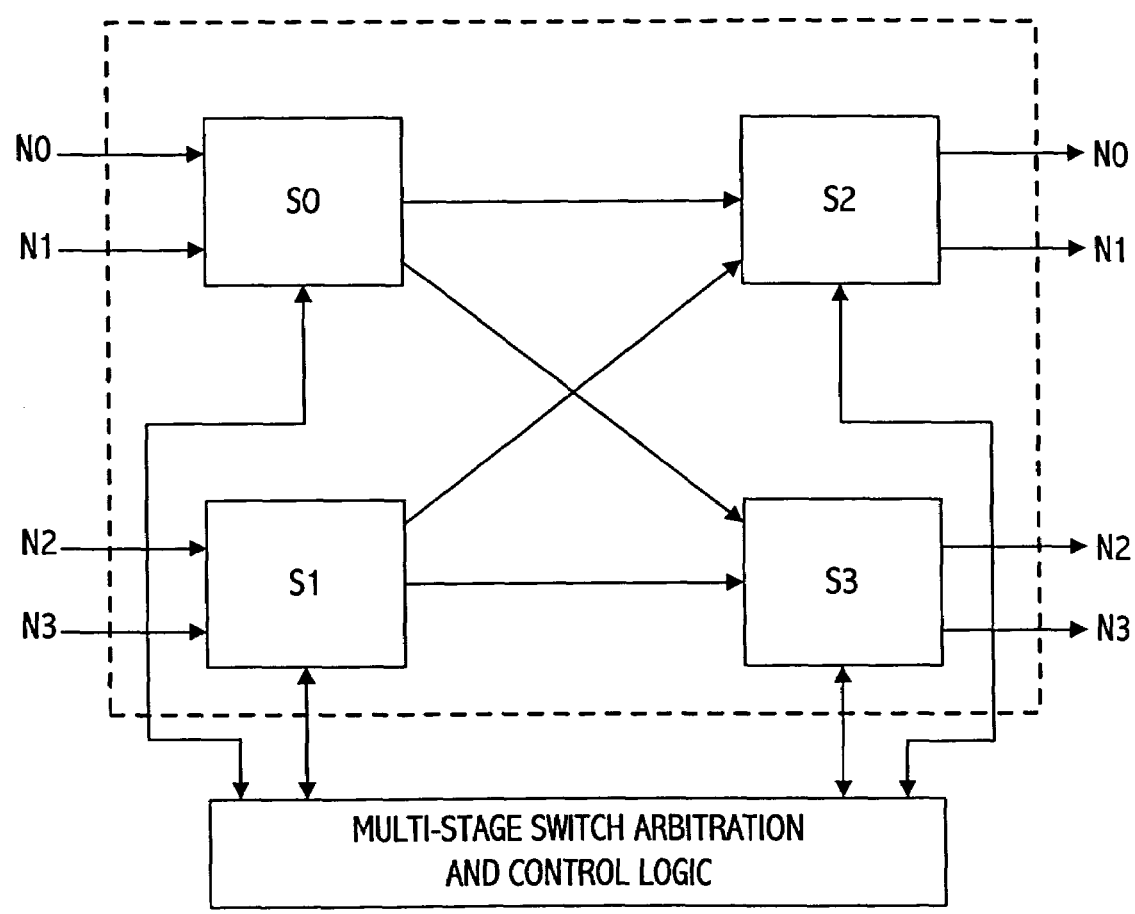
FIG. 16 illustrates a multi-stage switch configuration.

Optionally, the buffer-less switch is one of several switches cascaded, forming a multi-stage switch configuration to increase the number of network nodes. A simple embodiment of a multi-stage switch configuration is illustrated in FIG. 16.

Figure 7:
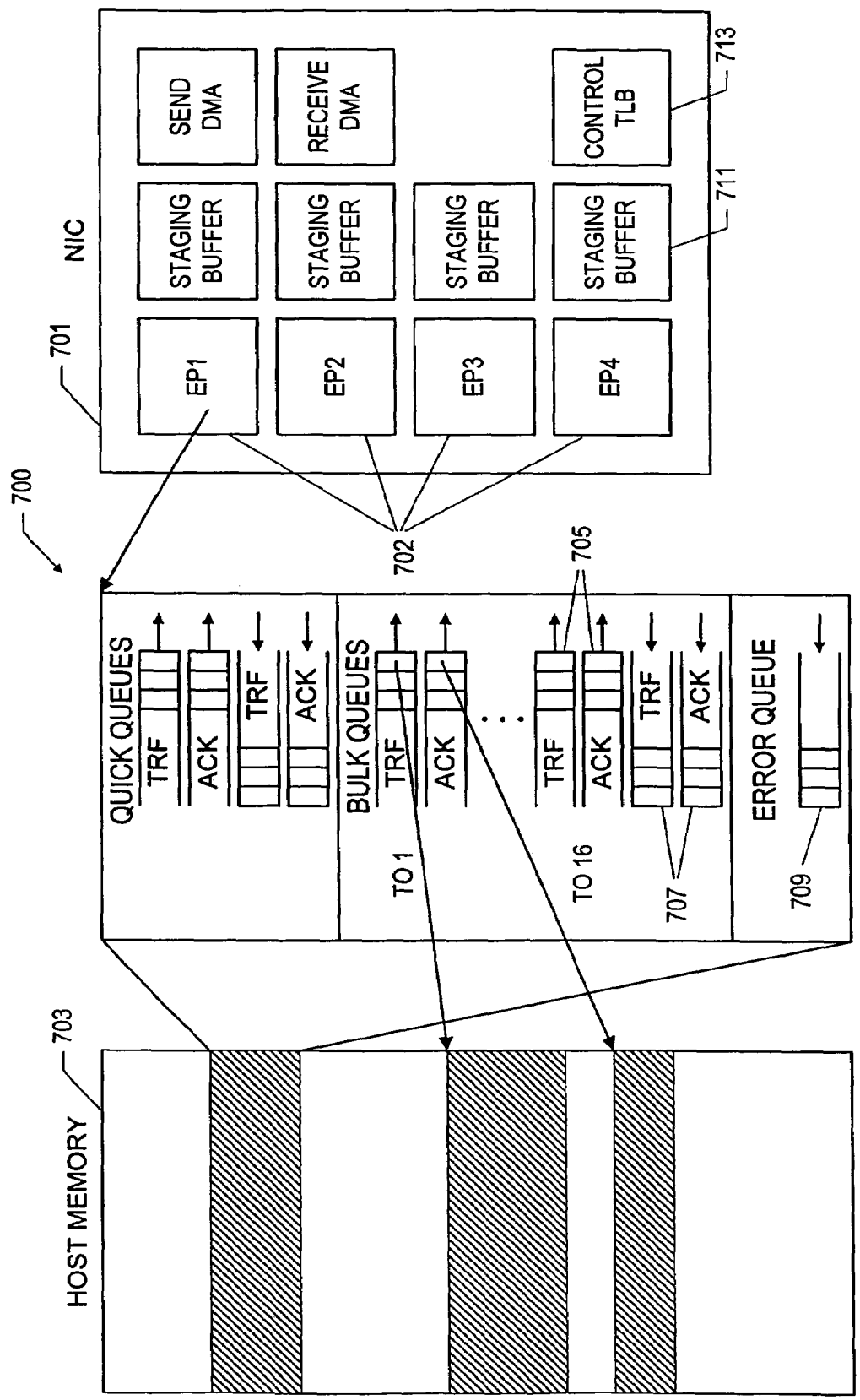
FIG. 7 is a block diagram illustrating aspects of a network node according to an embodiment of the present invention.

Referring to FIG. 7, another embodiment of an exemplary network node 700 is illustrated. In one embodiment, network interface card (NIC) 701 of node 700 is based on Active Messages 2.0 and the Virtual Network abstraction (see generally, A. Mainwaring: *Active Message Application Programming Interface and Communication Subsystem Organization*. University of California at Berkeley, Computer Science Department, Technical Report UCB CSD-96-918, October 1996; A. Mainwaring and D. Culler: *Design Challenges of Virtual Networks: Fast, General-Purpose Communication*. ACM SIGPLAN Symposium on Principles and Practice of Parallel Programming (PPOPP), Atlanta, Ga., May 4–6, 1999; B. Chun, A. Mainwaring, and D. Culler: *Virtual Network Transport Protocols for Myrinet*. IEEE Micro, vol. 18, no. 1, January/February 1998, pp. 53–63). This abstraction virtualizes the access points of the network in the form of endpoints. A collection of endpoints forms a virtual network with a unique protection domain. Messages are exchanged between endpoints, and traffic in one virtual network is not visible to other virtual networks. Endpoints are mapped into the address space of a process and can be directly accessed by the corresponding user-level program or kernel program. Thus, user-level communication does not involve the operating system.

NIC 701 holds a small number of active endpoints EP 702. The less active endpoints are stored in main memory 703. The endpoint information stored in the NIC 701 includes pointers to queues in main memory. There are separate queues for the quick channel and the bulk channel. To prevent fetch deadlock of the transfer-acknowledgment protocol, queues come in pairs, that is, there are separate queues for transfers and acknowledgments. There is one pair of queues each for sending and receiving messages over the quick channel. For the bulk channel, there is one pair of send queues, e.g., 705, for each receiving node and one pair of receive queues, e.g., 707 for all sending nodes. Thus, as shown in FIG. 7, there are 16 pairs of send queues and 1 pair of receive queues for a 16 port switch. In addition, there is an error queue 709 for reporting erroneous transmissions.

Two types of messages are supported by the illustrated node 700. Quick messages containing a 64-byte payload and bulk messages containing a 1-kByte payload. FIG. 4 shows the queues holding the corresponding message descriptors. The bulk and quick packet descriptor formats of the message descriptors are shown in Table 1. While the quick message descriptor contains an immediate payload, the bulk message descriptor contains an immediate payload and an additional payload specified by memory addresses pointing to the source and destination of the transfer. The staging buffers 711 hold that additional payload on its way from and to the main memory. Note that a bulk message descriptor can describe a transfer that includes many bulk packet transfers.

TABLE 1

| Bulk message descriptor | | Quick message descriptor | |
|---|---|---|---|
| message type | 4 bits | message type | 4 bits |
| source node id | 4 bits | source node id | 4 bits |
| source endpoint id | 2 bits | source endpoint id | 2 bits |
| source endpoint key | 32 bits | source endpoint key | 32 bits |
| destination node id | 4 bits | destination node id | 4 bits |
| destination endpoint id | 2 bits | destination endpoint id | 2 bits |
| destination endpoint key | 32 bits | destination endpoint key | 32 bits |
| immediate payload | 44 bytes | immediate payload | 64 bytes |
| source address | 64 bits | Total: | 74 bytes |
| destination address | 64 bits | | |
| transfer length | 32 bits | | |
| Total: | 74 bytes | | |

Since endpoints are accessed directly by user-level programs, memory addresses specified by the bulk message descriptor are virtual addresses. This requires address translations when message payloads are read from memory by the initiator and written to memory by the target. For this purpose, NIC 701 contains a local translation lookaside buffer (TLB) 713. TLB hits are handled in hardware, while TLB misses are handled in software. Since resolving a TLB miss may take a considerable amount of time, the receiving nodes drops messages that cause TLB misses since such messages could easily flood staging memory.

While several embodiments of various nodes and network interface cards have been described herein, one of skill in the art understands that those embodiment are exemplary only and a wide variety of node designs and network interfaces can be used to practice the various embodiments of the invention described herein.

Figure 8:
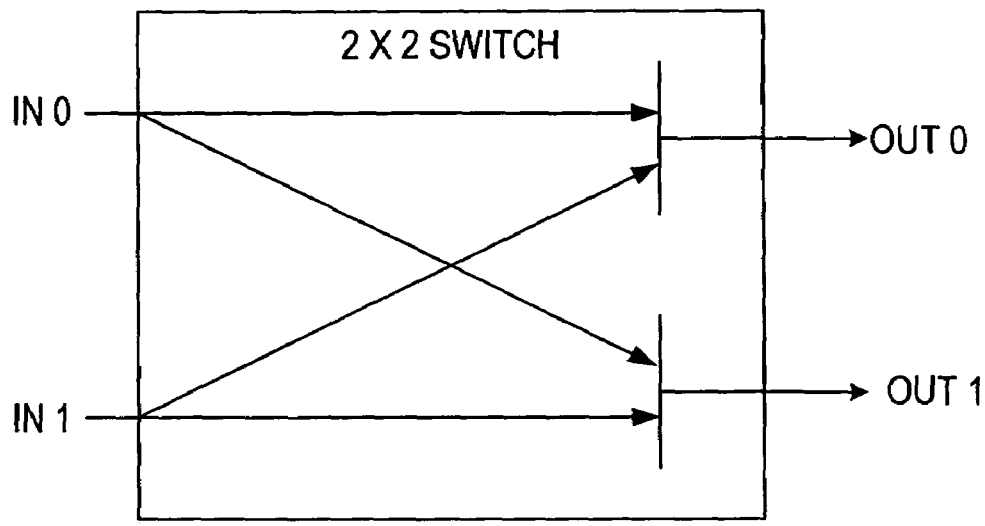
FIG. 8 is a block diagram of a simple 2×2 switch that may be used to implement the low latency switch.

Referring now to FIG. 8, a simple block diagram illustrates an embodiment of a low-latency switch that can be utilized in the embodiments shown in FIGS. 1 and 4. A low latency communication channel provides the ability to keep latency low for those kinds of communication for which low latency is particularly desirable. One type of communication for which low latency is valuable, besides those mentioned previously in this specification, is remote procedure calls. Communication latency includes sender overhead, transmission time, transport latency and receiver overhead. The low-latency network described herein can reduce communication latency, and, in particular, transmission time.

Low latency is achieved, in part, by allowing a network to lose packets. That way, an optimistic approach can be taken when planning the use of shared network resources such as output ports of a switch. Rather than coordinating and scheduling accesses to shared resources, such as registers, buffers, and, in particular, transmission paths, resources are assumed to be always available. In the event of a conflict, one packet wins and the other ones fail. If transmission fails, it is the sender's responsibility to resend the packet. The lossy network scheme works well in that it saves latency by avoiding time-consuming scheduling operations as long as the network resources are only lightly loaded and conflicts occur infrequently. Thus, it is preferable that a lossy network is designed in a way that the switches and links are not highly loaded, by providing, e.g., excess bandwidth. Excess bandwidth helps keep dropped packets to a minimum.

Figure 9A:
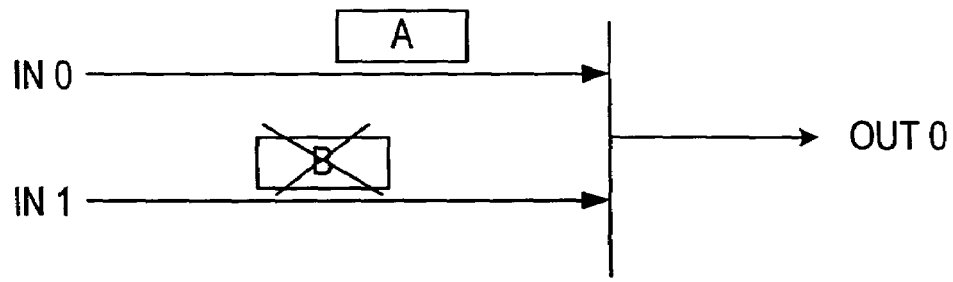
FIG. 9A illustrates that a first in time packet wins, in accordance with one embodiment of the low latency switch.
Figure 9B:
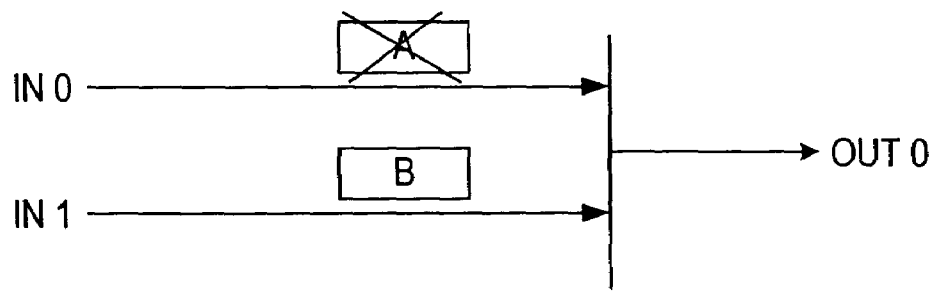
FIG. 9B illustrates an embodiment of the low latency switch where one packet is chosen as the winner based on a simple algorithm.

A lossy network is particularly attractive since it allows one to build simple and fast switches such as the switch illustrated in FIG. 8. Although a 2×2 switch is illustrated for ease of understanding, the concepts described herein associated with a lossy switch can be incorporated into any size switch. No time-consuming arbitration or scheduling of its data paths is required. Packets are forwarded on a first come first served basis. Thus, as shown in FIG. 9A, packet B is dropped because it arrived at the output port selector circuit later than packet A. If packets do happen to collide, one packet wins and the other packet(s) are dropped. Thus, as shown in FIG. 9B, packet A is chosen as the loser based on some simple algorithm such as a random or round robin selection. More sophisticated algorithms can be chosen such as selecting the winner according to a fairness criteria having an objective to allocate the same amount of output port bandwidth to each input port on the switch. Any approach used to choose a winner should preferably not add any more than necessary to latency.

Figure 10:
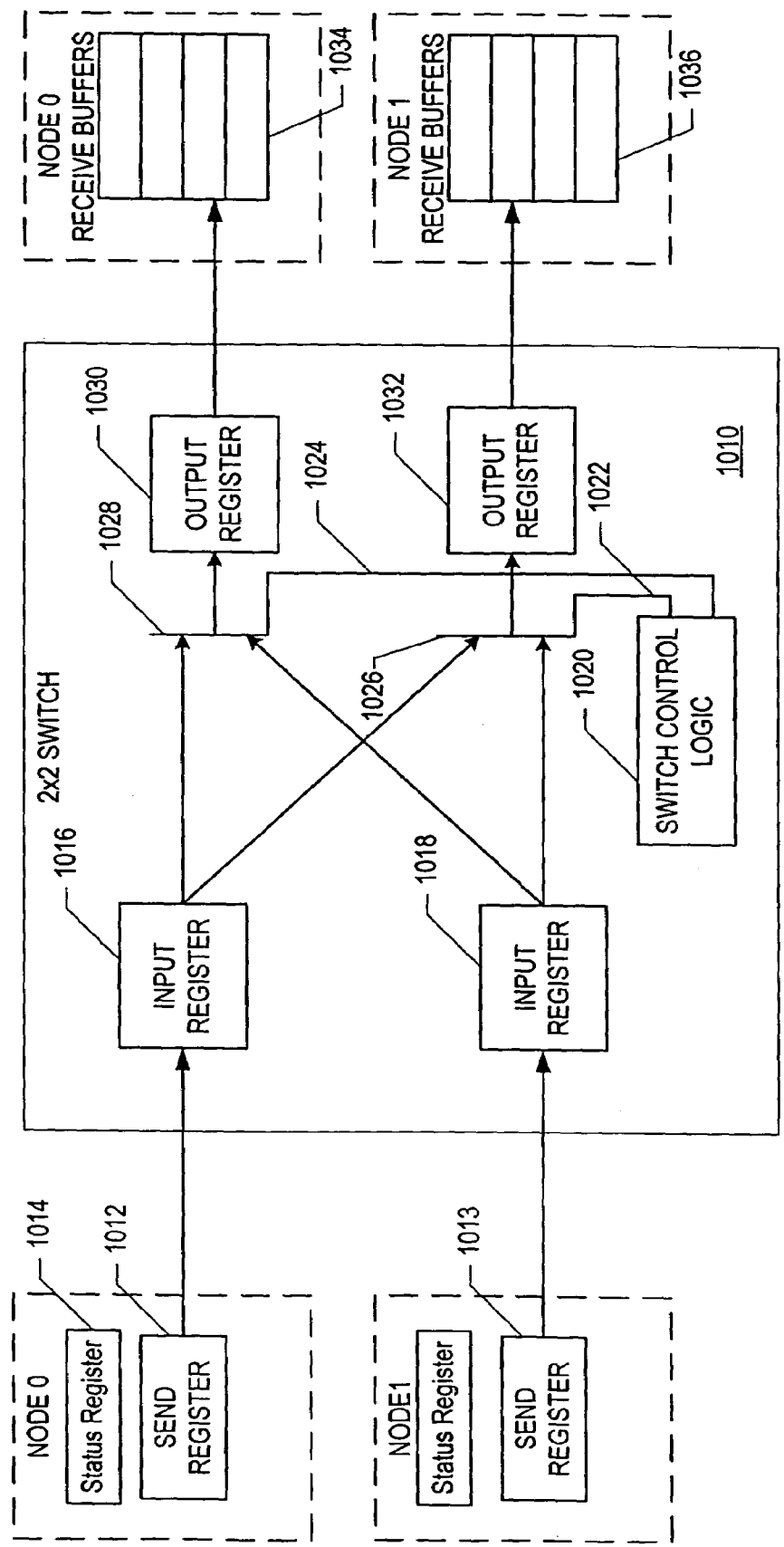
FIG. 10 is a block diagram of one embodiment of the lossy network.

Lossy communication also makes it possible to use simple and fast buffering schemes in the sending and receiving nodes of the network. Referring to FIG. 10, assume that the sender and the receiver are either a user program, a systems program, or a transmission protocol. FIG. 10 again illustrates a buffer-free 2×2 switch 1010. Assume that node 0 is sending a packet. To send a packet, a node 0 writes a packet into send register 1012. Node 0 then polls a status register 1014 until it becomes valid. Once the status register is valid, it will indicate whether the transmission was successful. If the status register indicates that the transmission was unsuccessful, the sender has to resend the packet by writing the packet into send register 1012. Because low latency communication is typically synchronous in that a sender cannot proceed until it is known that the transmission was successful, the sender can be put in charge of doing the retransmission if necessary. Successful and unsuccessful transmission can be determined with the help of an acknowledge packet (ack) or no acknowledge packet (nack), respectively, or a timeout mechanism in which the sending node waits a predetermined amount of time to see if an acknowledge indicating a successful transmission is received. If not, the sender assumes an error. When the target is node 1, the status register 1014 may receive an ack written into the node 1 send register when node 1 successfully receives the sent packet or may receive a nack when node 1 detects an error in receipt of a packet. The status register is thus coupled to receive information such as an acknowledge or no acknowledge packet received into the node 0 receive buffers. Latency is reduced in that no complicated data structure such as a list of buffers has to be processed.

In the embodiment shown in FIG. 10, packets are latched at switch boundaries. Send register 1012 sends a packet to input register 1016 in switch 1010. Each of the input registers 1016 and 1018 are coupled to switch control logic 1020 (connection not shown), which allocates output ports on switch 1010 according to requests from input registers 1016 and 1018. The requests are generated from header information in a packet received into the input registers. Thus, a packet is written into input registers 1016 and 1018, and necessary routing information is provided to switch control logic 1020. Switch control logic 1020 provides appropriate select signals 1022 and 1024 for select circuits 1026 and 1028, respectively. As previously described, if switch control logic 1020 receives more than one request for the same output port at the same time, the switch control logic 1020 selects one of the requests for a transmission path on the basis of a simple algorithm. Otherwise, transmission paths are provided on a first come first served basis. Note that the input registers 1016 and 1018 and output registers 1030 and 1032 are clocked by a periodic clock signal to provide storage for a fixed period, e.g., one clock period, but no buffering function with variable delays.

FIG. 10 also shows an exemplary embodiment for buffering in the receiving nodes. Output registers 1030 and 1032 provide data to the receive buffers 1034 and 1036 of the respective nodes. No buffer space is allocated before the packet is sent, it is simply assumed that buffer space is available upon receipt of a packet. If the receiver has to drop the packet because of buffer overflow or any other error, the sender is notified of the error condition either through a nack received from the receiver or because the operation timed out. If packet delivery fails, the sender has to resend the data since it is not buffered in the switch. The buffering configuration reduces latency in that no time is needed to allocate a buffer in the receiver before a packet is sent.

The unreliable behavior of the network simplifies other parts of the implementation of the network. In one simple implementation, the receiving node drops a packet when it detects a transmission error or when a receive buffer overflows. The transmission error may be detected using, e.g., a checksum or CRC. A timeout mechanism can inform the sender accordingly. A more sophisticated approach reports errors to the sender to allow the system to better determine the cause of packet loss. In any case, the network does not have to be able to retransmit erroneously transmitted packets, as that task is left to the sender. In fact, the task may be left to kernel software or application or user programs that made the transfer.

A further simplification can be achieved by having the receiver send an acknowledge or a nack at a fixed time relative to when the packet is sent. In that way, after a predetermined delay, a sender can check and determine conclusively whether transmission was successful. Either an acknowledge or a nack will be received within the predetermined time period or the sender can conclude that the transfer failed since an acknowledge (or nack) was not received after the fixed delay. Note that in some implementations, a timeout can be used instead of or in addition to a nack. In systems with variable forwarding delays, timeout mechanisms are less reliable as an indication of a transmission failure.

No intermediate buffers are needed between the sender and the receiver, as are typically found in other switching networks. If conflicts occur, rather than buffering a packet, packets are simply dropped. As a consequence, no buffering or buffer management including flow control is needed.

Thus, one implementation for a low-latency channel makes assumptions to try and simplify the switch implementation. While the teachings herein with regards to the low-latency architecture have been described generally in association with the dual channel network architecture described herein, one of skill in the art will appreciate that the teachings with regards to the low-latency channel are applicable anywhere a low-latency channel is implemented.

Figure 11A:
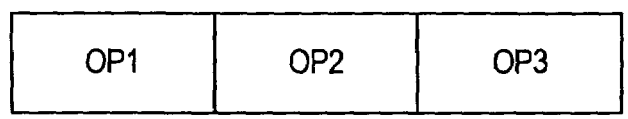
FIGS. 11A and 11B are diagrams illustrating advantages of a pipelined network.
Figure 11B:
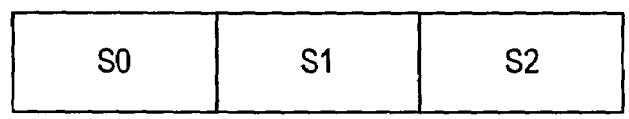
Figure 11B:
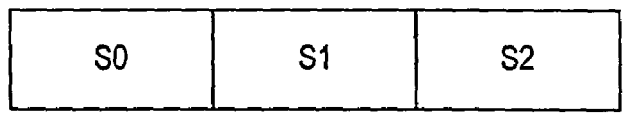
Figure 11B:
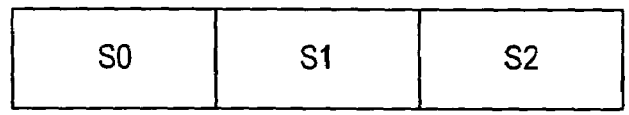

While the quick channel has minimum scheduling, one implementation for the bulk channel relies on pipelining to increase throughput. Pipelining is a technique to increase throughput by overlapping the execution of multiple operations. A pipeline breaks the execution of an operation into several steps also called pipeline stages. Overlapped execution is achieved in that each stage operates on a different operation. In its simplest form, a pipeline has a fixed number of stages of equal length. One advantage of applying pipeline techniques to computer networks is that they simplify design of the computer network. Referring to FIG. 11A, three sequential operations are shown OP1, OP2 and OP3. When pipeline techniques are used, portions of those operations can be overlapped as shown in FIG. 11B. Each operation shown is divided in three stages S0, S1 and S2. As can be seen, stage S1 from OP1 can be overlapped with stage S0 from OP2. The overlapping of the other stages is readily apparent from FIG. 11B. Because the operations no longer have to be executed serially, but can be executed at least partially in parallel, the execution rate is improved. The pipelined execution shown in FIG. 11B results in three times the throughput of the serial execution shown in FIG. 11A.

While the pipeline techniques are applicable to the bulk channel disclosed herein, the pipeline techniques described herein for a network are applicable to any network that can advantageously exploit the teachings herein regarding pipelined networks. Consider for example, a switched network with fixed forwarding delays that executes remote DMA write operations. The node that sources the data is called the initiator and the node that sinks the data is called the target.

In one embodiment, a pipeline implementation of a network includes the following four stages. An arbitration stage (ARB) is the stage in which initiators request routing paths and an arbiter calculates a schedule based on the routing paths requested by the initiators. A transfer stage (TRF) follows an arbitration stage. During the transfer stage, a transfer packet containing the data is sent from the initiator to the target. An acknowledge stage (ACK) follows the transfer stage. During the acknowledge stage the target returns an acknowledge packet containing a delivery report to the initiator. Finally, in this embodiment a check stage (CHK) follows the acknowledge stage in which the acknowledge packet is checked by the initiator to determine whether the operation succeeded. More stages might be required, for example, to transmit the transfer and acknowledge packets described.

In one embodiment packet size is fixed. If the remote DMA operation wants to transfer more data than fits into a single transfer packet, multiple transfer packets and with it multiple operations are needed. Fixed packet size greatly simplifies scheduling of the network. A pipelined network executes operations in bounded time. That simplifies the design in at least two areas, error detection and switch scheduling.

A pipelined network simplifies detection of lost packets. Networks typically have some degree of unreliability, in that a packet can be lost or erroneously transmitted. To detect this, handshaking protocols are used. Basically, such protocols confirm the receipt of a transfer packet by sending an acknowledgment packet back to the initiator. If the transmission paths of the network as well as the network interfaces are pipelined, the initiator can wait for a fixed amount of time, check for the arrival of an acknowledge packet and determine whether transmission succeeded.

In comparison with present network implementations that exhibit variable and unbounded transmission delays, the pipelined network provides several advantages. The number of outstanding operations and, with it, unacknowledged packets is fixed. With variable and unbound transmission delays, that number varies and can be quite large. Since state has to be stored for each unacknowledged packet, a large state memory and possibly sophisticated state management is required. Additionally, messages on the pipelined network are delivered in order. To guarantee progress, a network with variable delays often delivers packets out of order. That complicates bookkeeping of unacknowledged packets and assembling packets into larger data entities.

In a preferred embodiment, the pipelined network described herein has fixed forwarding delays for all transmission paths. It is, therefore, particularly well suited for small networks with a limited diameter and with a small number of nodes with a single switch connecting the nodes. It is also possible to cascade switches to increase the number of nodes that can be connected.

Figure 12:
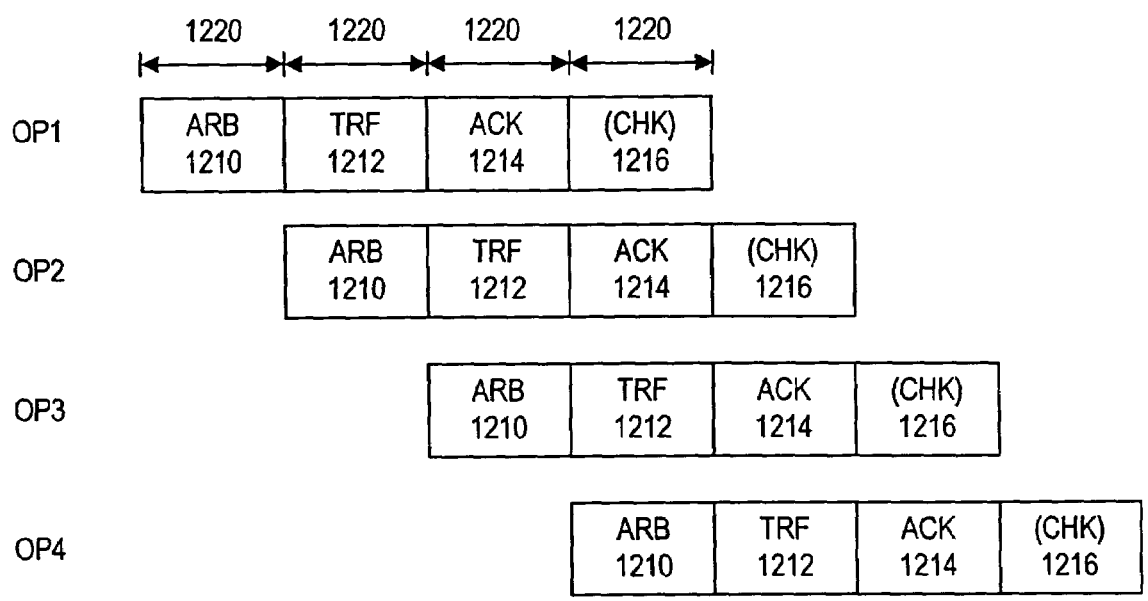
FIG. 12 is a diagram illustrating the various stages for several operations taking place on a pipelined network.

Referring now to FIG. 12, a packet flow diagram illustrates an embodiment of a synchronous pipelined network in which boundaries of all stages are aligned. FIG. 12 demonstrates a plurality of stages, including an arbitration stage 1210, a transfer stage 1212, and an acknowledge stage 1214. As shown, each of the stages 1220 has a fixed time relation to each other stage. The stages are shown to have equal length, however, one of skill in the art appreciates that the length of the stages optionally is variable depending on design requirements. Also, the number of stages may vary depending on design requirements. For example, the transfer stage could be split up into several stages. FIG. 12 shows a check stage 1216, as an optional stage. The check stage 1216 provides an optional stage in which sending nodes check if transmission of a sent packet was successful. The check stage is optional in that it can be omitted if the acknowledge stage already checks for successful transmission. FIG. 12 illustrates transactions occurring between two nodes of a network. Other transactions between other nodes in a switched network system may also be occurring at the same time.

As can be seen in FIG. 12, the transfer stage 1212 during which a packet is being transferred across the network can be overlapped with a subsequent arbitration stage 1210. In fact, all four stages can be overlapped. One approach to providing overlapping operations can utilize a network such as the one shown in FIG. 4. Referring again to FIG. 4, assume that that bulk channel 450 is part of the pipelined switched network. The arbitration stage can utilize the quick channel 460 to send request packets and grant packets. During an arbitration stage, a vector of requests can be sent from a requesting node to the arbiter shown as bulk switch scheduler 440 and bulk switch scheduler 440 can send a grant to the requesting node. To avoid potential conflicts between arbitration stage packets (request and grant packets) and other traffic on quick channel 460, a scheme as described with relation to quick channel 460 can be used such that request packets from the nodes during the arbitration stage can be forwarded directly from the input ports 422 of quick channel switch 460 to the switch scheduler 440 without passing through the switching fabric of quick channel switch 460. Grant packets are given higher priority than other packets when they are forwarded from bulk scheduler 440 to output ports 432 to avoid conflicts with other quick channel traffic. That avoids collisions within the switching fabric and the potential of dropping of request and grant packets.

In the embodiment shown in FIG. 4, the nodes 430 send acknowledge packets during the acknowledge stage to nodes 420 on quick channel 460 in response to data transferred during the transfer stage. Those acknowledge packets are transferred within the switch fabric of quick channel 460. The timing of sending acknowledgment packets can be chosen such that collisions with request and grant packets are avoided. If nodes 420 simultaneously send acknowledgment packets in response to transfer packets sent during the previous bulk frame, and if the acknowledgment packets are sent at a different time than the request and grant packets, it is guaranteed that the acknowledge packets can not collide in quick channel switch 460 with either the request and grant packets.

That can be accomplished as follows. Assume the nodes and the switch use a common schedule to schedule the transmission of request, grant and acknowledgment packets. There are fixed times relative to the bulk frame when those packets are sent. For example, assume a bulk frame takes 1024 time units. Also assume that the request packets are transferred from the initiator nodes to the switch scheduler at time 1, the grant packets are transferred from the switch to the initiator nodes at time 512, and the bulk channel acknowledge packets are transferred from the target nodes to the initiator nodes at time 256. Since the packets are sent at different times, they cannot collide with each other.

There could be collisions of the three types of packets mentioned with regular packets sent over the quick channel. As previously described, the request packets will not collide with regular packets since they are taken off the network at the input ports of the switch, from where they are forwarded to the arbiter, and, therefore, do not pass through the switching fabric where collisions could occur. The grant packets are forwarded from the arbiter to the output ports of the switch where they are injected into the network. Logically, there is a separate input port connected to the arbiter. Grant packets can collide with regular packets. If that happens, grant packets win and regular packets lose, as previously stated. Since the nodes know the time when the grant packets are sent, they could avoid conflicts by not sending regular packets in the corresponding slot.

Acknowledge packets are handled similarly to the grant packets. If there is a collision with a regular packet, the grant packet wins and the regular packet loses. Note that in some implementations, there should not be any regular packet present in the network when acknowledge packets are transmitted. Assuming every node sends an acknowledge packet, and acknowledge packets are sent at the same time, there can only be regular packets in the network in case of an error or a misbehaving node.

The acknowledge packets can be forwarded through the quick switch in a conflict-free manner. The settings of the quick channel switch used for forwarding the acknowledge packets correspond to the inverted settings of the bulk channel switch used for forwarding the corresponding transfer packets—it is the direction of transfers that has been reversed. E.g., if the transfer packet was transferred from input port 1 to output port 2 of the bulk channel, the acknowledge packet needs to be forwarded from input port 2 to output port 1 of the quick channel switch.

In addition, because the pipeline is synchronized, the quick switch can send a special packet once per bulk frame to each node for synchronization purposes. The grant packet, which may be sent at a fixed time in the frame (e.g. at time 512), can be used for synchronization purposes by the nodes. The quick channel switch transfers a grant packet to every node once per bulk frame. All nodes implicitly know the time relative to the bulk frame that the grant packet is sent. Therefore, the receipt of a grant packet by a node can be used as a time reference and the node can derive the beginning of a frame from this reference. The grant packet may also be used to supply the node with a unique identifier. In that case, each grant packet contains a unique identifier which corresponds to the number of the output port through which the grant packet was sent. During node initialization, the node listens to grant packets and uses the supplied identifier as its node identifier which is used by all communication for identifying a node.

The pipelined network may include a flow control mechanism. In one embodiment, an arbiter, on receiving a request for a particular output port, queries the node at the output port for its availability to receive a packet or packets. The node replies with a go/no-go to the arbiter as to its readiness as a form of simple flow control. The arbiter then allocates the output port according to availability and other criteria it uses in its arbitration scheme. The packets that include flow control information are also preferably transferred over the quick channel.

In typical networks, each node is typically both an initiator node and a target node. That is, each node is generally coupled to both an input port and an output port. That allows, in one embodiment, for the flow control information to be included in the request packet in the form of a bit vector that specifies which initiator may send packets to the node (as a target) that is sending the request packet. That flow control information may be based on the state of queues, which a node may have dedicated to a particular initiator. Thus, if the queue holding data from initiator 1 is full, the bit vector would indicate that the node was unable to accept any further data from initiator 1.

Note that the bit vector for flow control purposes may also be used to ignore a node that is, e.g., determined to be broken. In that way, a misbehaving node can be ignored. Similarly, the ports on the quick channel switch may be enabled and disabled using an enable vector sent from the various nodes as part of the grant packet.

Note that the length of the transfer stage may provide more time than is necessary to complete the arbitration stage and the acknowledge stage. The check stage is performed in the node and therefore generally does not interfere with other pipeline operations.

Because it can be advantageous in terms of bulk channel speed to implement the bulk channel with a flow through switch that does not need to extract data from the packets, arbitrating over the quick channel is an advantage. The quick channel, on the other hand, does extract data from the data packets to select destination ports, for example, and thus can be advantageously used for arbitration as well. If the bulk channel carried arbitration traffic as well, one could intersperse request and grant packets between packets sent during the transfer stage. But that would separate the transmission of the request packet and the grant packet by one bulk frame, possibly requiring one more pipeline stage before the corresponding data could be sent in the transfer stage. Note that in some embodiments, the arbiter also has to determine at least minimum flow control information from the targets. For the same reasons, transmission of the acknowledge packet in response to a packet sent over the bulk channel during the transfer stage is preferably done over the quick channel.

Figure 13:
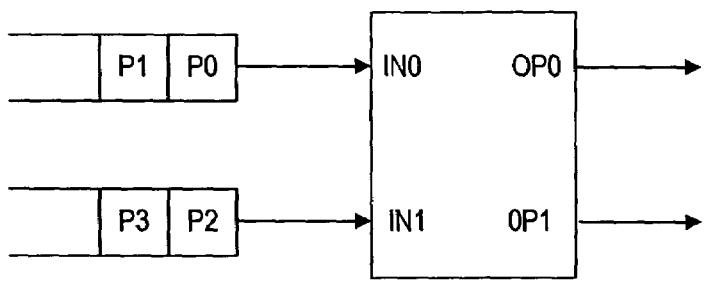
FIG. 13 is a diagram of a pipelined network in which collision avoidance and detection techniques can be utilized.
Figure 14:
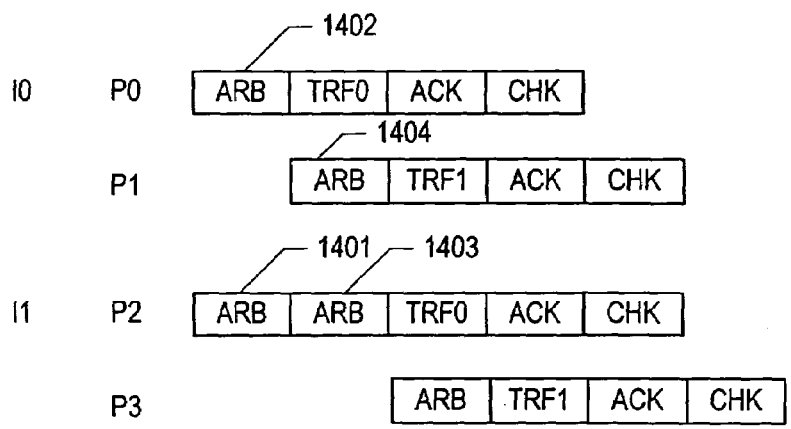
FIG. 14 is a diagram illustrating collision avoidance techniques in a pipelined network.
Figure 15:
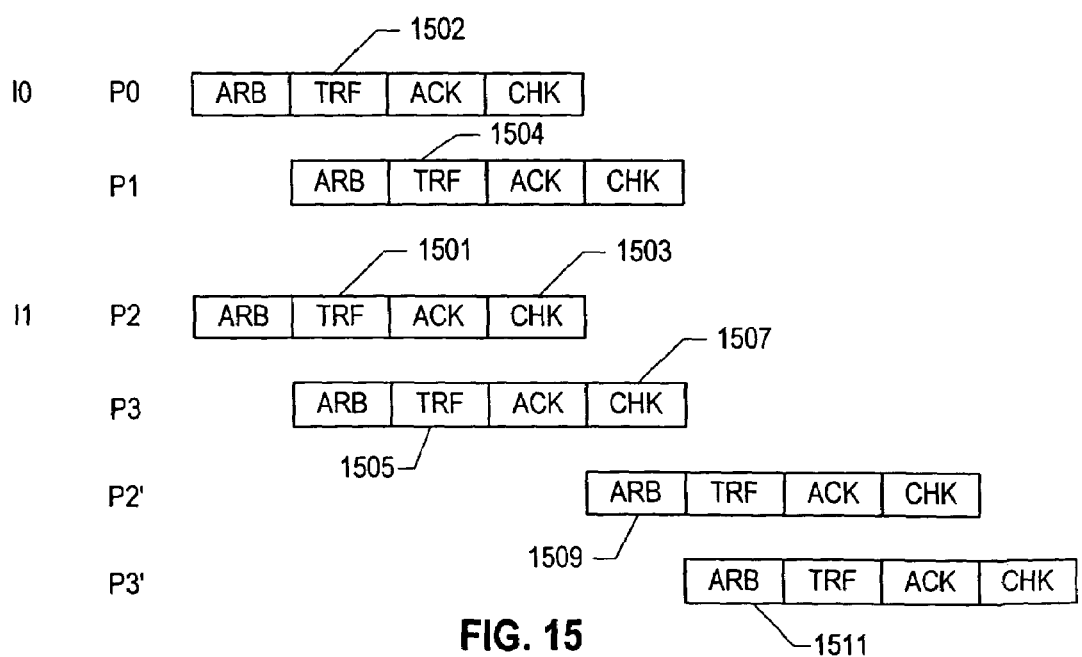
FIG. 15 is a diagram illustrating operation of collision detection techniques in a pipelined network.

Depending on the type of scheduling that is used in a pipelined network implementation, conflicts arise if multiple packets are to be transferred over a common path of a network. A conflict can either be avoided by scheduling the usage of the resource or it can be resolved in that conflicts are detected and lost packets are resent. The former strategy is called collision avoidance, the latter one is called collision detection. Referring to FIG. 13 a pipelined network is shown for which collision avoidance and collision detection strategies are illustrated in FIGS. 14 and 15. Assume in FIG. 13 that packets P0 and P2 are destined for output port 0 (OP0) and packets P1 and P3 are destined for output port 1 (OP1).

FIG. 14 describes the principle of operation of a pipelined network, in which conflicts are avoided by scheduling the usage of the network resources. In a switched network, conflicts occur if multiple input ports of the switch forward packets to the same output port. If a schedule is used to tell sending nodes when to insert packets onto the switch so that there never is conflicting usage of the switch's output ports, conflicts are avoided. Note that the same schedule can be used to route the transfer and the acknowledge packets of the pipeline described above; the connections are the same, only the direction of the packets changes.

In the example illustrated in FIG. 14, the arbiter calculates a conflict-free schedule based on the requested routing paths. Since it is known well in advance when a packet passes through a certain stage, conflicts caused when multiple packets in the pipeline use a shared resource can be easily determined and avoided. Thus, the request in ARB 1401 for packet P2 is not granted due to the conflict with ARB 1402 for packet P0. As a consequence, scheduling of packet P2 is delayed by one cycle. In the next cycle, the request in ARB 1403 for packet P2 and the request in ARB 1404 for packet P1 are granted since they do not conflict.

FIG. 15 describes an alternative pipeline network that detects collisions rather than avoiding them. The network detects loss of packets due to collisions using a handshaking protocol such as the acknowledges, nacks, and timeouts, described above. Referring to FIG. 15, packet P2 collides with packet P0 at TRF 1501 and TRF 1502, respectively. Packet P2 is lost as a result. That failure is detected at CHK 1503. Packet P3 collides with P1 at TRF 1505 and TRF 1504, respectively. Assuming that P1 wins, the failure of P3 is detected at CHK 1507. Input port 1 then resends both P2 and P3 as P2' and P3' at ARB 1509 and ARB 1511, respectively. Thus, the collisions are detected by the handshaking and the system resends data in response. Applied to the example of a switched network, the initiator detects the loss of a packet if it does not receive an acknowledge packet a certain amount of time after the transfer packet was inserted into the pipeline. That scheme to detect collisions can be attractive if collisions are infrequent and if end-to-end latency, as well as the time taken to calculate a schedule, is to be kept as short as possible.

Thus a pipelined network has been described that may be implemented as a switched, ring-based or a bus-based network or a combination. The network pipelining techniques are applicable to any network that can overlap pipeline stages to achieve greater throughput on the network.

The embodiments of the data networks, computer systems, methods and switches described above are presented as examples and are subject to other variations in structure and implementation within the capabilities of one reasonably skilled in the art. The details provided above should be interpreted as illustrative and not as limiting. For example while the various embodiments have generally shown single switch stages, any of the switches shown herein can be cascaded into multiple switch stages and/or be cascaded with other switched or bused networks. Other variations and modifications of the embodiments disclosed herein, may be made based on the description set forth herein, without departing from the scope and spirit of the invention as set forth in the following claims.

What is claimed is:

1. A computer system coupled with a pipelined network comprising:
    a plurality of initiator nodes coupled to send packets, into the network;
    a plurality of target nodes coupled to receive packets sent into the network; and
    a plurality of pipeline stages for transmitting data across the network, each pipeline stage consuming a predetermined time period, thereby providing for a predetermined time period for transmission for each packet successfully sent between one of the initiator nodes and one of the target nodes, the pipeline stages including an arbitration stage; and
    arbitration logic coupled to the initiator nodes, the pipelined network, and the target nodes,
    wherein for a particular transfer, the arbitration logic is coupled to receive an indication from a particular target node for the particular transfer as to whether the particular transfer can be supported in the particular target node;
    wherein the initiator nodes supply requests to the arbitration logic for transmission of respective packets to respective target nodes during respective arbitration stages, the arbitration logic responsive to the initiator node requests to schedule packet transmission across the network.

2. The computer system as recited in claim 1 wherein the pipelined network is synchronous in that boundaries of all the pipeline stages are aligned.

3. The computer system as recited in claim 1, wherein the pipeline stages include a transfer stage and an acknowledge stage, the stages being in a fixed time relation to each other.

4. The computer system as recited in claim 3, the pipeline stages having equal length.

5. The computer system as recited in claim 3 further comprising a check stage in which an initiator node checks if transmission of a sent packet was successful.

6. The computer system as recited in claim 3 wherein during the transfer stage the packet supplied by the initiator traverses the network.

7. The computer system as recited in claim 3 wherein during the acknowledge stage, an acknowledge packet is returned by the target node to the initiator node.

8. The computer system as recited in claim 7 wherein the acknowledge packet is checked by the initiator during the check stage.

9. The computer system as recited in claim 8 wherein the check stage is fixed in time in relation to the arbitration stage, thereby allowing the initiator node to check for successful completion of sending the packet a fixed time after the arbitration stage.

10. The computer system as recited in claim 3 wherein the transfer stage includes multiple pipeline stages to transmit the transfer packet across the network.

11. The computer system as recited in claim 3 wherein the acknowledge stage includes multiple stages to transmit the acknowledge packet across the network.

12. The computer system as recited in claim 3 wherein the number of bytes transferred per request during the transfer stage is fixed.

13. The computer system as recited in claim 3 wherein outstanding transactions across the pipelined network are delivered in order.

14. The computer system as recited in claim 1 further comprising a switch coupling the nodes on the pipelined network.

15. The computer system as recited in claim 14 wherein the pipelined network comprises a plurality of cascaded switches.

16. A computer system coupled with a pipelined network comprising:
    a plurality of initiator nodes coupled to send packets, into the network;
    a plurality of target nodes coupled to receive packets sent into the network;
    a plurality of pipeline stages for transmitting data across the network, each pipeline stage consuming a predetermined time period, thereby providing for a predetermined time period for transmission for each packet successfully sent between one of the initiator nodes and one of the target nodes wherein the pipeline stages include an arbitration stage, a transfer stage, an acknowledge stage, the stages being in a fixed time relation to each other;
    arbitration logic coupled to the initiator nodes, the pipelined network, and the target nodes, the initiator nodes supplying requests to the arbitration logic for transmission of respective packets to respective target nodes during respective arbitration stages, the arbitration logic responsive to the initiator node requests to schedule packet transmission across the network,
    wherein for a particular transfer, the arbitration logic is coupled to receive an indication from a particular target node for the particular transfer as to whether the particular transfer can be supported in the particular target node.

17. A method for transmitting information across a pipelined computer network, comprising:
    transmitting the information from an initiator node to a target node using a plurality of pipeline stages in the computer network, each pipeline stage having a fixed forwarding delay;
    overlapping an operation in one pipeline stage with another operation in another pipeline stage;
    requesting a path through the network from the initiator node to the target node during an arbitration stage from arbitration logic, the arbitration logic communicating with the target node to determine if the target node can accept a packet from the initiator node;
    sending at least one data packet containing the information from the initiator node to the target node during one or more transfer stages; and
    sending an acknowledge packet containing status of receipt of the data packet from the target to the initiator during one or more acknowledge pipeline stages;
    wherein during the arbitration stage, the arbitration logic provides a grant indication to the initiator node to indicate that the initiator node can transmit the packet during a subsequent transfer stage.

18. The method as recited in claim 17 wherein at least one of the arbitration stage, the transfer stage and the acknowledge stage are overlapped.

19. The method as recited in claim 17 wherein the pipelined network includes a first switching circuit coupling the initiator node and the target node, the first switching circuit carrying information transmitted during the transfer stage.

20. The method as recited in claim 19 wherein the pipelined network includes a second switching circuit coupling the initiator node and the target node, the second switching circuit being independent of the first switching circuit and wherein information for at least a portion of pipeline operations are carried over the second switching circuit simultaneously with operations for the transfer stage carried over the first switching circuit.

21. The method as recited in claim 20 wherein information for the arbitration and acknowledge stages are carried over the second switching circuit during arbitration and acknowledge pipeline stages, respectively.

22. The method as recited in claim 17 further comprising generating a schedule for traversing the pipeline stages of the network in the arbiter, the schedule determining for each slot on the pipeline, each slot being a length of a pipeline stage, which input port is connected to which output port.

23. A method as recited in claim 17 wherein each initiator node of a plurality of initiator nodes provides a request vector indicating one or more desired target nodes, to the arbitration logic, the request vectors for at least some of the initiator nodes including multiple target nodes and wherein the arbitration logic schedules a future pipeline slot to avoid conflicts, the arbitration logic globally scheduling use of the network.

24. The method as recited in claim 17 further comprising the initiator node checking the acknowledge packet a fixed number of pipeline stages after sending the transfer packet, to determine whether transmission of the information was successful.

25. The method as recited in claim 17 further comprising sending all information across the network in order.

26. A method for transmitting information across a pipelined computer network, comprising:
    transmitting the information from an initiator node to a target node using a plurality of pipeline stages in the computer network, each pipeline stage having a fixed forwarding delay;
    overlapping an operation in one pipeline stage with another operation in another pipeline stage;
    requesting a path through the network from the initiator node to the target node during an arbitration stage from arbitration logic, the arbitration logic communicating with the target node to determine if the target node can accept a packet from the initiator node; and
    scheduling usage of the network using an arbiter in response to requests from initiator nodes to allocate each stage of the pipeline so as to avoid conflicts for network resources.

27. The method as recited in claim 26 wherein the scheduling includes accounting for prescheduled requests, the prescheduled requests requesting periodic slots on the network.

* * * * *